United States Patent
Hanamura et al.

(10) Patent No.: US 8,350,419 B2
(45) Date of Patent: *Jan. 8, 2013

(54) SINGLE-SHAFT LINEAR MOTOR, MULTI-SHAFT LINEAR MOTOR, AND COMPONENT TRANSFER APPARATUS

(75) Inventors: Naoki Hanamura, Shizuoka (JP); Kiyotaka Sakai, Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 285 days.

This patent is subject to a terminal disclaimer.

(21) Appl. No.: 12/747,078

(22) PCT Filed: Jan. 7, 2009

(86) PCT No.: PCT/JP2009/050085
§ 371 (c)(1),
(2), (4) Date: Jun. 9, 2010

(87) PCT Pub. No.: WO2009/088019
PCT Pub. Date: Jul. 16, 2009

(65) Prior Publication Data
US 2010/0296906 A1 Nov. 25, 2010

(30) Foreign Application Priority Data
Jan. 11, 2008 (JP) .................................. 2008-004078

(51) Int. Cl.
*H02K 41/02* (2006.01)
*H02K 41/03* (2006.01)

(52) U.S. Cl. ................. 310/12.02; 310/12.15; 310/12.33
(58) Field of Classification Search ............... 310/12.03, 310/12.09, 12.21, 12.31, 12.02
See application file for complete search history.

(56) References Cited

U.S. PATENT DOCUMENTS
6,191,507 B1    2/2001 Peltier et al.
(Continued)

FOREIGN PATENT DOCUMENTS
JP    7-107728    4/1995
(Continued)

OTHER PUBLICATIONS
JP 11-043852 Machine Translation, Jun. 15, 2012.*
(Continued)

*Primary Examiner* — Quyen Leung
*Assistant Examiner* — Thomas Truong
(74) *Attorney, Agent, or Firm* — Studebaker & Brackett PC; Donald R. Studebaker

(57) ABSTRACT

The present invention relates to a linear motor provided with a magnetic body and an armature. The liner motor is adapted to produce a force causing the magnet body and the armature to be relatively displaced along a given linear moving direction by interaction of magnetic fluxes generated between the magnetic body and the armature during an operation of supplying electric power to the armature. In a typical aspect, the linear motor of the present invention comprises a movable section attached to a base plate adapted to set the moving direction on a base surface thereof, in such a movable manner as to relatively reciprocate along the moving direction with respect to the base plate. A mover is provided on the movable section and formed as one of the magnetic body and the armature. A stator is provided on the base surface of the base plate in such a manner as to be disposed opposed to the mover in a widthwise direction, and formed as the other one of the magnetic body and the armature to extend along the moving direction. A standing wall is provided on an outer peripheral edge of the base plate at least at a position which is along the moving direction, to define a containing space in cooperation with the base surface. The containing space is opened to allow the stator, the mover, and the movable section to be selectively mounted therein and removed therefrom in a direction perpendicular to the base surface.

10 Claims, 18 Drawing Sheets

U.S. PATENT DOCUMENTS

| | | |
|---|---|---|
| 6,441,515 B1 | 8/2002 | Shimura |
| 7,456,526 B2 | 11/2008 | Teramachi et al. |
| 2006/0108879 A1 | 5/2006 | Sugita et al. |
| 2007/0096567 A1 | 5/2007 | Miyamoto et al. |
| 2007/0247008 A1* | 10/2007 | Miyamoto ................ 310/14 |
| 2008/0309260 A1* | 12/2008 | Kanai et al. ................ 318/38 |

FOREIGN PATENT DOCUMENTS

| | | |
|---|---|---|
| JP | 11-043852 | 2/1999 |
| JP | 11-43852 A | 2/1999 |
| JP | 2006-180645 A | 7/2006 |
| WO | 02/37652 A1 | 5/2002 |
| WO | WO 2006011341 A1 * | 2/2006 |
| WO | 2006/068322 A1 | 6/2006 |

OTHER PUBLICATIONS

JP 2006-180645 Machine Translation, Jun. 15, 2012.*
The Extended European Search Report dated Dec. 29, 2011; Application No./ Patent No. 09700170.5-1242/2230752 PCT/JP2009050085.
International Search Report; PCT/JP2009/050085; Apr. 14, 2009.

* cited by examiner

SINGLE-SHAFT LINEAR MOTOR, MULTI-SHAFT LINEAR MOTOR, AND COMPONENT TRANSFER APPARATUS

TECHNICAL FIELD

The present invention relates to a single-shaft linear motor, a multi-shaft linear motor, and a component transfer apparatus, and more particularly, to a single-shaft linear motor adapted to move a movable section linearly with respect to a base plate, a multi-shaft linear motor comprising a plurality of the single-shaft linear motors assembled together, and a component transfer apparatus using the single-shaft or multi-shaft linear motor.

BACKGROUND ART

A driving mechanism which is designed to drive in an upward-downward direction a suction nozzle for suction-holding a component is provided in apparatuses, for example, in component transfer apparatuses for handling components such as an electronic component, or in manufacturing apparatuses for manufacturing a semiconductor device, such as a liquid-crystal display device. These apparatuses employ a linear motor as an element of the driving mechanism. Demand for this type of linear motor, especially a high-performance linear motor has been increasing year by year. To meet such a need, a linear motor, particularly a liner motor that is suitable for a component transfer apparatus has been proposed (see, for example, the following Non-Patent Document 1).

A conventional linear motor has generally been provided with a hollow cuboid housing with a wall thickness sufficient for mechanical strength. The housing contains a plurality of annular-shaped coils each having a hollow hole. These coils are arranged such that central axes of the hollow holes thereof align along a longitudinal direction of the housing, to form a stator in its entirety. Also, through-holes are formed in each of upper and lower walls of the housing to have a size slightly greater than that a diameter of a driving shaft so as to movably receive the driving shaft. Aligned coils as a stator are fixed to position hollow holes thereof to be concentric to each of the through-holes. The driving shaft, as a mover which is composed of a permanent magnet, is inserted into the through-holes and the hollow holes of the aligned coils to penetrate through the aligned coils concentrically.

Patent Document 1: JP 2006-180645A (FIGS. 5 and 8)

DISCLOSURE OF THE INVENTION

To obtain a high-performance, the linear motor is required to adjust relative position (alignment) between a driving shaft (mover) and a coil (stator) with a high degree of accuracy. It is also required to improve not only ease of assemble but also maintenance serviceability.

It is a primary object of the present invention to provide a high-performance linear motor excellent in ease of assemble and maintenance serviceability.

It is another object of the present invention to provide a component transfer apparatus using the above linear motor.

One aspect of the present invention relates to a shingle-shaft linear motor provided with a magnetic body and an armature. The shingle-shaft linear motor is adapted to produce a force causing the magnet body and the armature to be relatively displaced along a given linear moving direction by interaction of magnetic fluxes generated between the magnetic body and the armature during an operation of supplying electric power to the armature. The shingle-shaft linear motor comprises a base plate adapted to set the moving direction on a base surface thereof, a movable section attached to the base plate in such a movable manner as to relatively reciprocate along the moving direction with respect to the base plate, a mover provided on the movable section, and formed as one of the magnetic body and the armature, a stator provided on the base surface of the base plate in such a manner as to be disposed opposed to the mover in a widthwise direction, and formed as the other one of the magnetic body and the armature to extend along the moving direction, and a standing wall provided on an outer peripheral edge of the base plate at least at a position which is along the moving direction, to define a containing space in cooperation with the base surface. The containing space is opened to allow the stator, the mover, and the movable section to be selectively mounted therein and removed therefrom in a direction perpendicular to the base surface.

In the single-shaft linear motor formed in the above structure, the containing space surrounded by the standing wall and the base surface is defined to have an opening opened in the direction perpendicular to the base surface, so that each of the stator, the mover, and the movable section can be assembled to and disassembled from the base plate by an insertion/pull-out operation with a relatively short stroke in a direction opposed to the base plate. This makes it possible to facilitate positioning of the stator and the mover to improve assembling accuracy.

In the conventional single-shaft linear motor, on the contrary, the stator and the mover are arranged concentrically. It is therefore necessary to insert or pull out the mover along the moving direction with a relatively long stroke in an assembling/disassembling operation. Such assembling operations are anything but easy. It would be difficult to maintain high assembling accuracy in the assembling/disassembling operation. Thus, it is extremely difficult to maintain alignment between the through-holes, the stator, and the driving shaft. Moreover, in the conventional single-shaft linear motor, it is required to adjust relative position between the housing and the aligned coils, in advance of adjustment of relative position between the driving shaft and the aligned coils. Specifically, to preserve accurate alignment of through-holes to be formed in the upper and lower walls of the housing and aligned coils to be arranged inside the housing with respect to a vertical direction, the conventional structure requires high-accuracy in positioning the through-holes and in forming aligned coils, respectively in the housing. The conventional structure further requires the driving shaft to be inserted into the through-holes and the hollow hole of the aligned coils, preserving the accurate positioning of the driving shaft relative to the housing. Positioning to the housing, the aligned coils, and the driving shaft should be assembled into the linear motor. Such an assembling operation is, however, anything but easy. It is therefore difficult to produce a high-performance linear motor. To preserve alignment between respective ones of the through-holes, the stator, and the driving shaft with a high degree of accuracy, the conventional single-shaft linear motor thus involves a complicated operation in production thereof. As above, there has been a room for further improvements in ease of assemble.

The standing wall in the present invention is provided on the outer peripheral edge of the base plate at least at a position which is along the moving direction, so that the opening of the containing space containing therein the stator, the mover, and the movable section is defined to have broadening in the moving direction and the widthwise direction. Thus, it becomes possible to significantly facilitate access to the containing space. In addition, the assemble operation is also easier to be perceived visually, making it possible the operator to check a positional relationship between the stator and the mover. In these respects, assembling accuracy between the base plate and the stator, and assembling accuracy between the assembled stator and the mover of the movable section, are drastically improved, which makes it possible to adjust relative position therebetween with a high degree of accuracy to obtain a high-performance single shaft linear motor. In contract, the conventional single-shaft linear motor is designed such that the driving shaft is inserted into the hollow hole of the aligned coils pre-positioned relative to the through-holes. This causes difficulty in visual check. Consequently, it has been significantly difficult to preserve alignment between the through-holes, the stator, and the driving shaft.

In addition to ease of assemble, the present invention makes it possible to significantly improve maintenance serviceability. Specifically, in an operation, such as maintenance or repair, for the single-shaft linear motor, the movable section and the mover can be dealt as a single unit to be disassembled from or re-assembled to the linear motor, making it possible to reduce time and effort for the disassembling and re-assembling. In contrast, in the conventional single-shaft linear motor, the maintenance to selectively take out a coil from the aligned coils in the housing requires sequential pre-operations: pulling the driving shaft out of the housing; detaching the upper and lower wall members of the housing; and detaching the coil to be inspected or replaced. In other words, it is impossible to simultaneously conduct the operation of pulling out the driving shaft and the operation of detaching the upper and lower walls of the housing, resulting in an increase in time and effort. Moreover, after the inspection/replacement, it is necessary to conduct a re-assembling operation which is substantially identical to assembling operations in manufacturing of the linear motor. Thus, the conventional single-shaft linear has inherently included cost in terms of maintenance serviceability.

The standing wall formed in the present invention improves the rigidity of the base plate. Arranging all the movable sections, the stator, and the mover within the containing space, the present invention also makes it possible to increase the strength of the single-shaft linear motor. In addition to the aspect of strength, the formation of the standing wall also contributes to effectively preventing entry of foreign substances from the outside.

Another aspect of the present invention is a multi-shaft linear motor which comprises a plurality of the above single-shaft linear motors in a stacking fashion.

Yet another aspect of the present invention is a component transfer apparatus which is provided with the above single- or multi-shaft linear motors to serve as an upward/downward driving mechanism of a head unit.

According to the component transfer apparatus of the present invention, because the above linear motor(s) is/are employed as the upward/downward driving mechanism, the component transfer apparatus can be improved in ease of assemble and maintenance serviceability thereof. In addition, the high-performance linear motor thus employed makes it possible to achieve high-accuracy positioning and high-speed movement of a suction nozzle attached to a forward end of a nozzle shaft.

These and other features and advantages of the present invention will become more apparent from embodiments thereof to be described with reference to the accompanying drawings.

BEST MODE FOR CARRYING OUT THE INVENTION

With reference to the drawings, the best mode for carrying out the present invention will now be specifically described.

The present invention relates to a single-shaft linear motor LM adapted to move a movable section linearly with respect to a base plate, a multi-shaft linear motor MLM comprising a plurality of the single-shaft linear motors LM assembled together, and a component transfer apparatus using either one of the (single-shaft and multi-shaft) linear motors LM and MLM. The detailed descriptions will be separated into two parts: regarding a linear motor LM and MLM according an embodiment of the present invention; and regarding a surface mounter according an embodiment of the present invention, which is one example of a component transfer apparatus using the linear motor LM and MLM. To clarify a directional relationship in each of the following illustrative figures, XYZ rectangular coordinate axes on the basis of a linear motor LM and MLM are shown therein. Among the three directions X, Y, Z, a moving direction to be set for the linear motor LM and MLM, a widthwise direction of the linear motor LM and MLM, and a frontward-rearward direction of the linear motor LM and MLM, are indicated by Z, Y, and X, respectively. Also, the signs (+, −) in each of the rectangular coordinate axes designate a frontward side (+X side), a rearward side (−X side), one edge side (−Y side), the other edge side (+Y side), a forward side (−Z side) and a backward side (+Z side), in the directions X, Y, Z, for descriptive purposes.

<Linear Motor>

Figure 3:
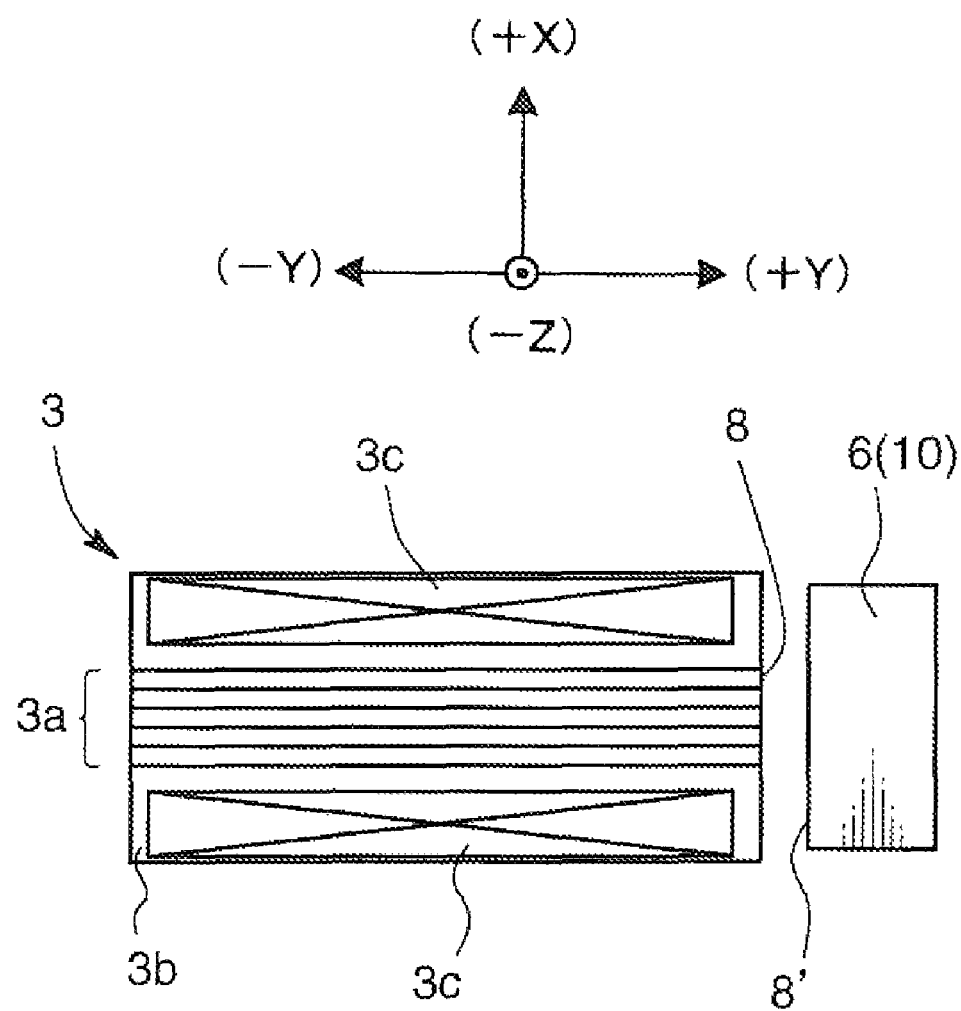
FIG. 3 is a diagram showing an arrangement relationship between an armature and a mover in the single-shaft linear motor illustrated in FIG. 1.
Figure 4:
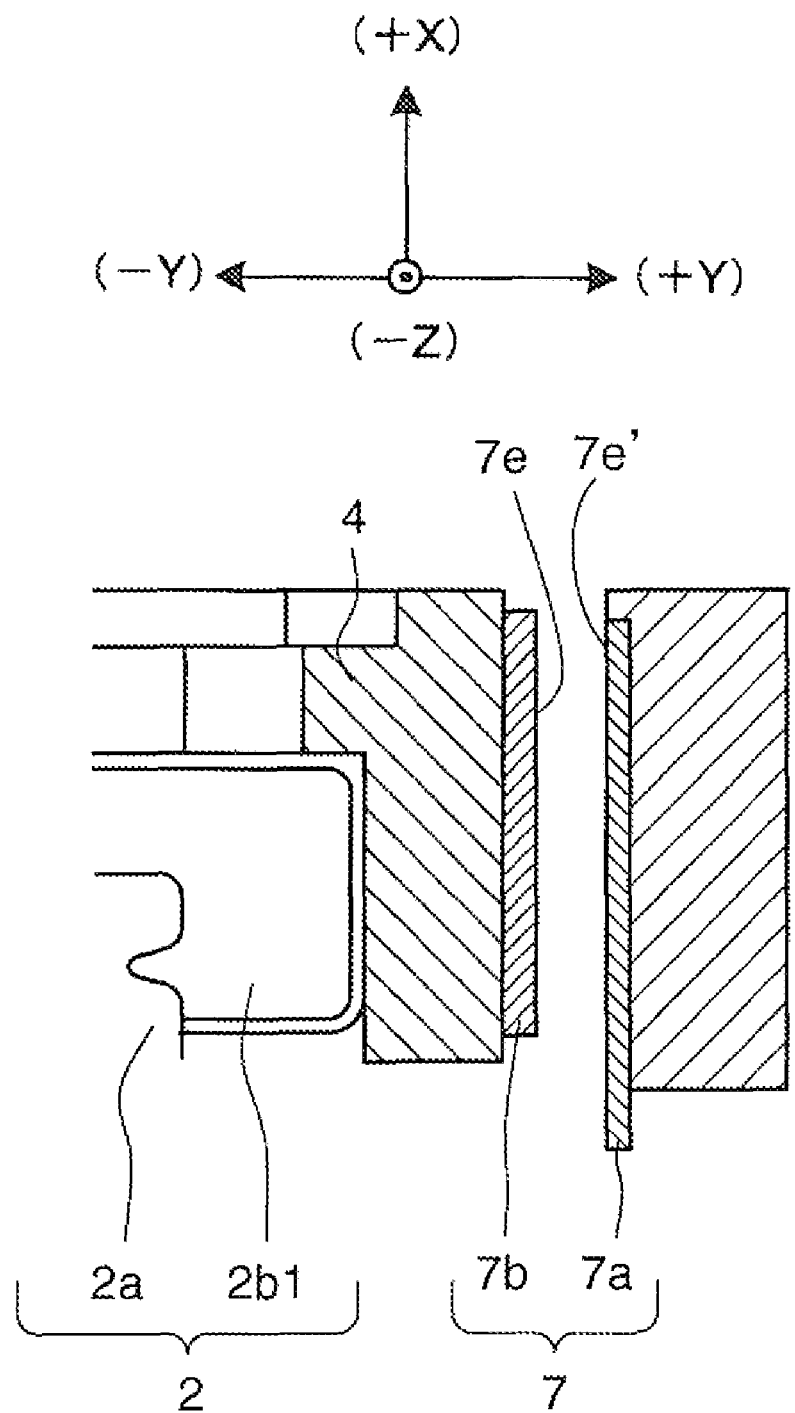
FIG. 4 is a diagram showing an arrangement relationship between a linear scale and a sensor in the single-shaft linear motor illustrated in FIG. 1.
Figure 5:
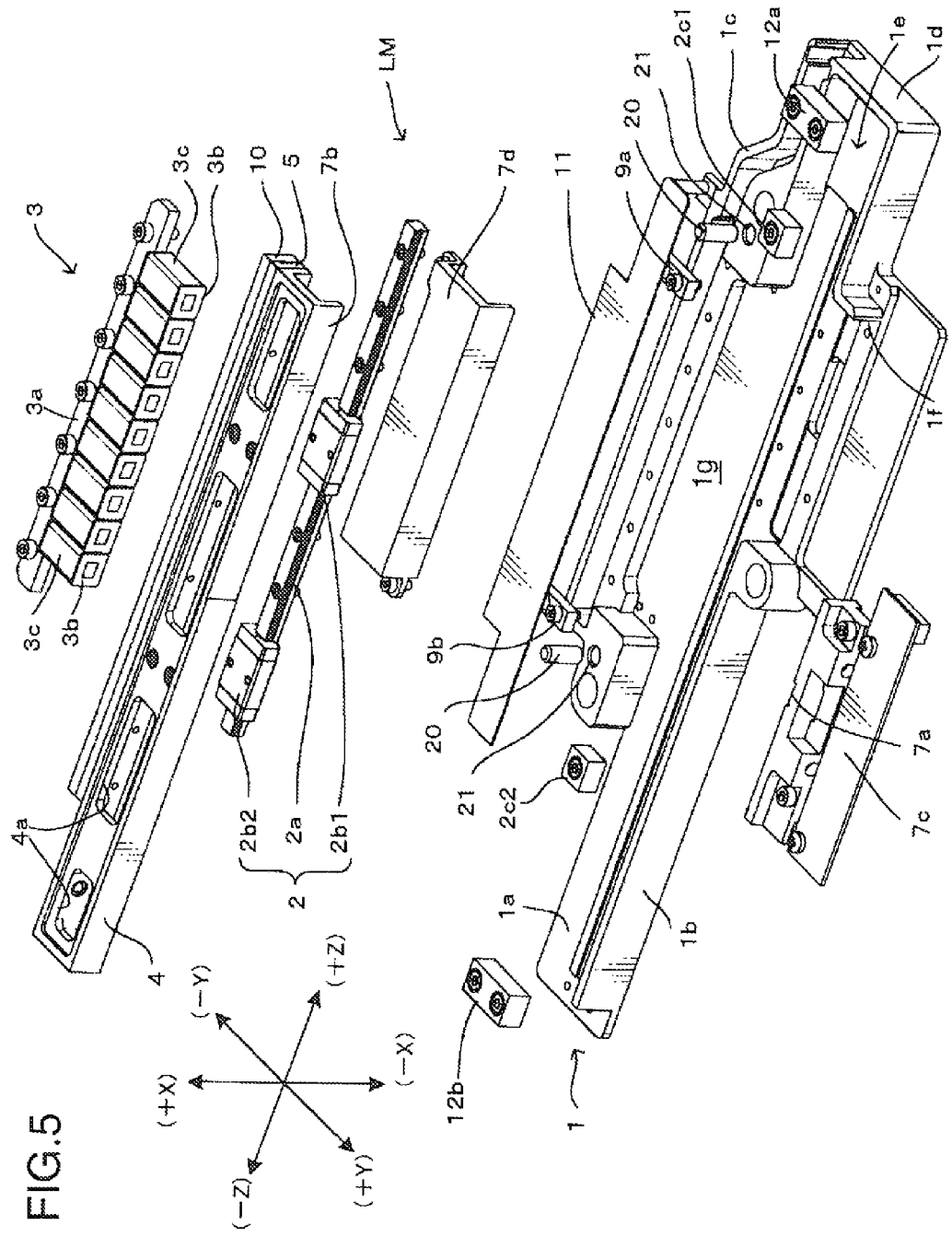
FIG. 5 is an exploded perspective view of the single-shaft linear motor illustrated in FIG. 1.

Referring to FIGS. 1 to 5, a single-shaft linear motor LM has a thin tray-shaped base plate 1. The base plate 1 is designed such that a longitudinal direction thereof defines a given moving direction Z. As shown in FIG. 5, an inner bottom surface of the base plate 1 is formed as the base surface 1a. Standing walls 1b to 1d, which are standing toward a frontward side (+X side) of the single-shaft linear motor LM, are continuously formed along both edges of the base plate 1 on respective opposite sides (+Y and −Y sides) in a widthwise direction Y of the single-shaft linear motor LM and an edge of the base plate 1 on a backward side (+Z side) in the moving direction Z. These standing walls 1b to 1d and base surface 1a make up a bottomed recess portion 1e opened toward the frontward side (+X side). The recess portion 1e is one example of a containing space for containing therein elements of the single-shaft linear motor LM in an after-mentioned manner. The numeral 1h in FIGS. 1 and 2 designates a spring engagement portion for allowing one of opposite ends of a return spring 15 (see FIG. 18) for biasing a movable base 4 toward the backward side (+Z side) to be attached thereto, as described later. In the first embodiment, the base surface 1a and the standing walls 1b to 1d are integrally molded using an aluminum alloy or the like to form the base plate 1 as a non-magnetic member. Alternatively, the base plate 1 may be formed by producing the base surface 1a and the standing walls 1b to 1d separately and then assembling these elements together. Although the base plate 1 is made of such a non-magnetic material, it is understood that the base plate 1 may be made of a resin material.

As above, in the first embodiment, the frontward-rearward direction X corresponds to a direction perpendicular to the base surface 1a. A space or the recess portion 1e, which are surrounded by standing walls 1b to 1d extending along the frontward direction and the base surface 1a, corresponds to a "containing space" in the appended claims. In the first embodiment, a forward-side (−Z side) of the base plate 1 in the moving direction Z is open so that the standing walls 1b to 1d define an open zone 1j communicating between an internal space (containing space) of the recess portion 1e and an outside of the internal space. In the first embodiment, the formation of the open zone 1j allows a forward-side (−Z side) end of an after-mentioned movable base and a part of a block member to be moved in and out of the internal space of the recess portion 1e according to driving of the movable base in the moving direction Z.

A single linear guide 2 is provided on the base surface 1a to extend along the moving direction Z. The linear guide 2 comprises a linear-shaped rail 2a fixed to the base plate 1 along the moving direction Z, and two sliders 2b1, 2b2 each attached to the rail 2a slidably only in the moving direction Z. Also, in order to prevent the sliders 2b1, 2b2 from leaving the rail 2a, two linear guide stoppers 2c1, 2c2 are attached to the base surface 1a of the base plate 1 at positions opposed to respective opposite longitudinal ends of the linear guide 2.

A movable base 4 is attached to the sliders 2b1, 2b2 to extend along the moving direction Z. The movable base 4 has an internal space having a reverse U shape in transverse section (section taken along an X-Y plane). The movable base 4 is fixed to the sliders 2b1, 2b2, allowing a ceiling surface of the internal space to be seated on respective upper surfaces of the sliders 2b1, 2b2. In the first embodiment, a plurality of through-holes 4a are formed in the ceiling surface of the movable base 4 to facilitate a reduction in weight of the movable base 4. As above, in the first embodiment, the movable base 4 and the sliders 2b1, 2b2 are adapted to be integrally movable in the moving direction Z, to serve as an element equivalent to a "movable section" in the appended claims. As described next, a mover is attached to a lateral surface of the movable base 4 on one edge side (−Y side) in the widthwise direction Y, and a linear scale 7b is attached to a lateral surface of an end of the movable base 4 on the other edge side (+Y side) in the widthwise direction Y.

Figure 6:
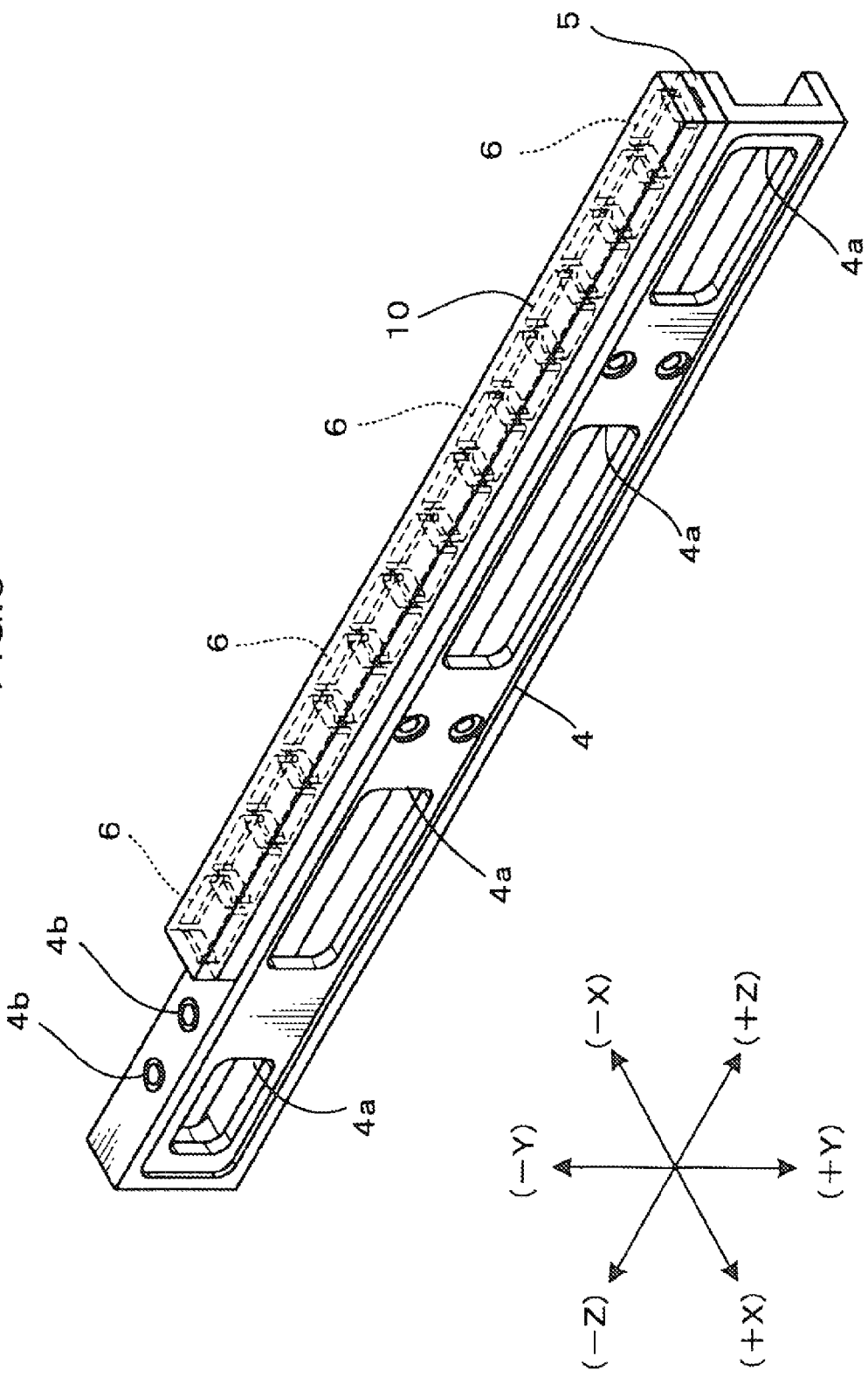
FIG. 6 is a perspective view showing an assembled structure of a movable member and the mover in the single-shaft linear motor illustrated in FIG. 1.
Figure 7:
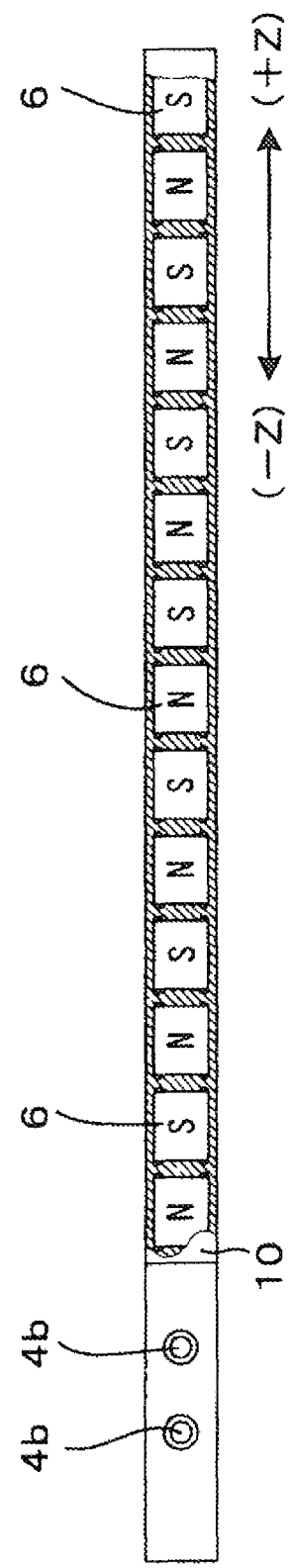
FIG. 7 is a diagram showing the assembled structure of the movable member and the mover in the single-shaft linear motor illustrated in FIG. 1.
Figure 8:
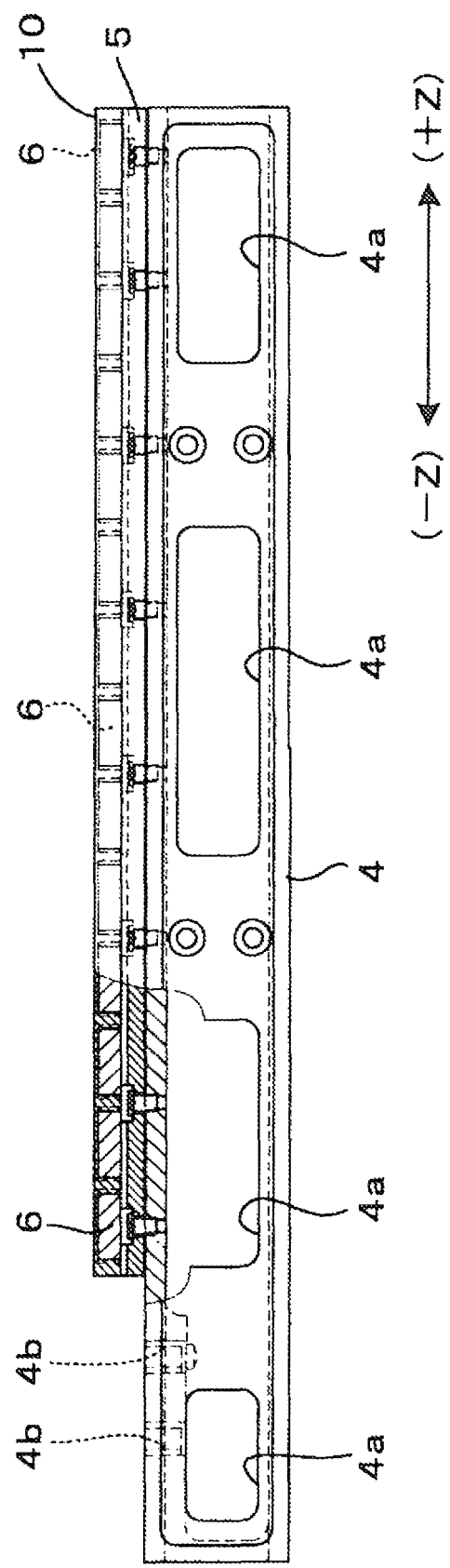
FIG. 8 is a partially broken-out side view showing the assembled structure of the movable member and the mover in the single-shaft linear motor illustrated in FIG. 1.

Referring next to FIGS. 6 to 8, a yoke 5, which is made of a ferromagnetic material, is attached to a lateral surface of the movable base 4. The lateral surface is one edge side (−Y side) in the widthwise direction Y of the movable base 4. A permanent magnet array 6 is attached to a surface of the yoke 5 in a line, in such a manner that a permanent magnet having an N-pole opposed to the surface and a permanent magnet having an S-pole opposed to the surface are alternately arranged along the moving direction Z (in the first embodiment, total fourteen permanent magnets). A mover 10 of the single-shaft linear motor LM is made up of the permanent magnet array 6 and the yoke 5. In the first embodiment, the permanent magnet array 6 is molded within a resin layer constituting an outer shell of the mover 10, to protect surfaces thereof, which makes it possible to effectively prevent damage or the like of the permanent magnet array 6. The resin layer covers the permanent magnet array 6, leaving a space on the forward side (−Z side) in the moving direction Z with respect to the mover 10, so that a portion of the lateral surface of the movable base 4 on the forward side with respect to the mover 10 is exposed.

Two female screw portions 4b are formed in the exposed region of the movable base along the moving direction Z. The female screw portions 4b are one example of coupling means for attaching a driven object to an end of the movable base 4 on the one edge side directly or through a coupling unit 164 (see FIG. 18). In an after-mentioned surface mounter, for example, the coupling unit 164 (see FIG. 18) is coupled to the movable base 4 using the female screw portions 4b, and then a nozzle shaft as a driven object is connected to the coupling unit 164. In other words, a driven object can be attached to the movable base 4 through the coupling unit 164 coupled to the end of the movable base 4 using the female screw portions 4b. This point will be more specifically described in the following "SURFACE MOUNTER" Section.

Figure 2:
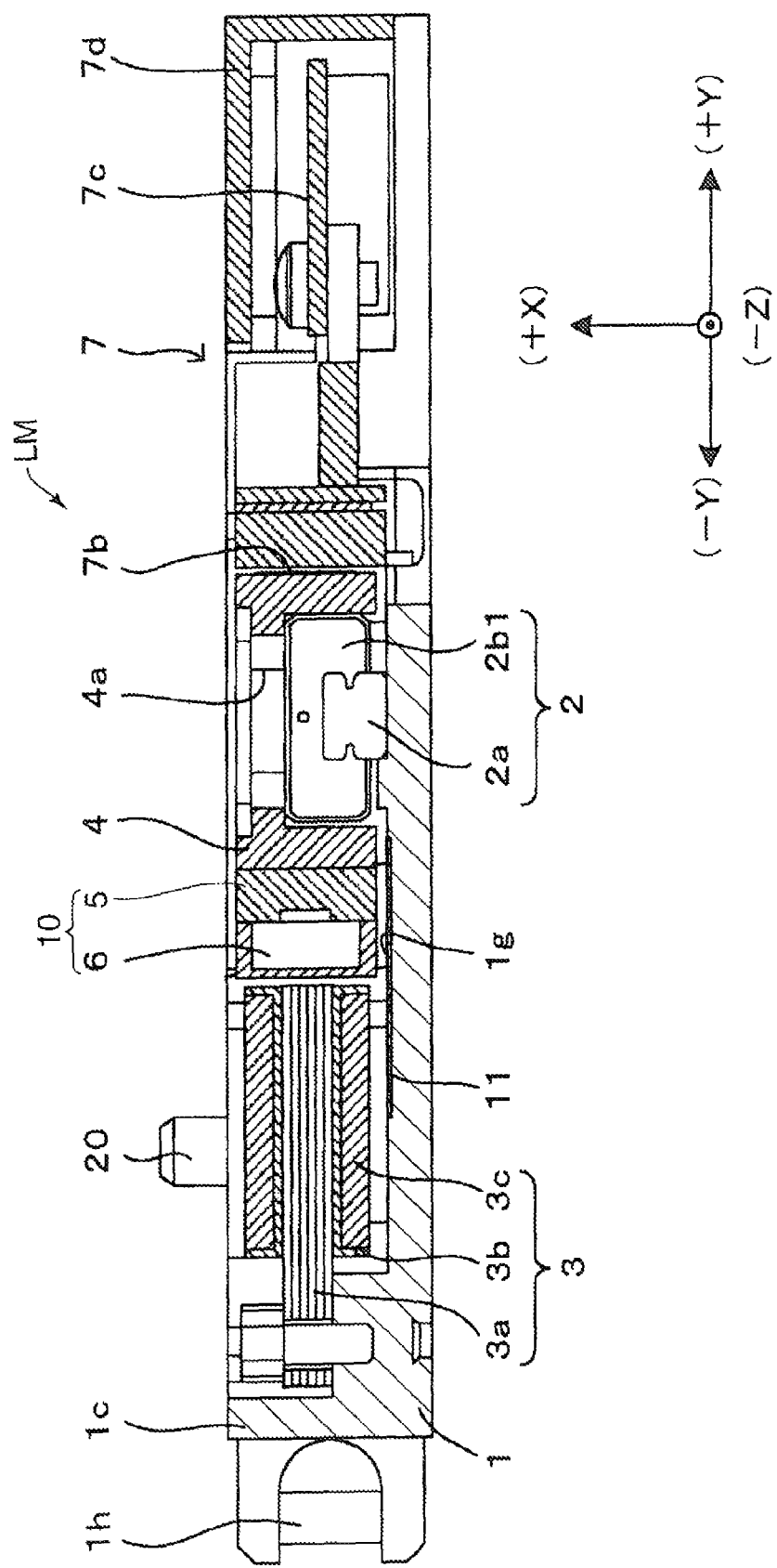
FIG. 2 is a sectional view taken along the arrowed line II-II in FIG. 1.

Referring next to FIG. 2, an armature 3, as one example of a "stator" in the appended claims is disposed on the one edge side in the widthwise direction Y with respect to the mover 10 made up of the yoke 5 and the permanent magnet array 6 as described above, and fixed to the base surface 1a of the base plate 1. The armature 3 comprises a core 3b, a plurality of hollow-shaped bobbins 3b, and a plurality of coils 3c formed by winding an electric wire around respective outer peripheries of the bobbins 3b. The core 3a is formed by laminating in a frontward-rearward direction X a plurality of comb-shaped silicon steel plates (unit plates) each having a longitudinal direction extending on a Y-Z plane and along the moving direction Z. A plurality of teeth are formed in a portion of the silicon steel plate lamination on the other edge side (+Y side) in the widthwise direction Y, at regular intervals along the moving direction Z. In the core 3a formed in the above structure, the plurality of teeth are arranged side by side in a line at regular intervals in the moving direction Z to form a tooth array. Then, the plurality of bobbins 3b each pre-wound with the coil 3c are mounted to respective ones of the teeth. In this manner, an array of a plurality of (in the first embodiment, nine) teeth of the core 3a and a plurality of coils 3c wound around the tooth array are provided at the same intervals along the moving direction Z to form the armature 3. The armature 3 is disposed opposed to the mover 10. In the first embodiment, as shown in FIG. 3, the armature 3 is designed such that each of a distal end surface 8 (surface on the +Y side) of the teeth of the core 3a wound with the coils 3c, and a counter surface 8' of the permanent magnet array 6 of the mover 10 opposed to the distal end surface 8, becomes parallel to an X-Z plane including the frontward-rearward direction X and the moving direction Z. When a current is applied to respective ones of the coils 3c in a given sequence from a motor controller whose illustration is omitted, a propulsion force in the moving direction Z is generated in the mover 10 by interaction between the magnetic pole of the distal end surface 8 and the magnetic pole of the counter surface 8' arranged as described above, so that the movable base 4 is driven in the moving direction Z.

Figure 9:
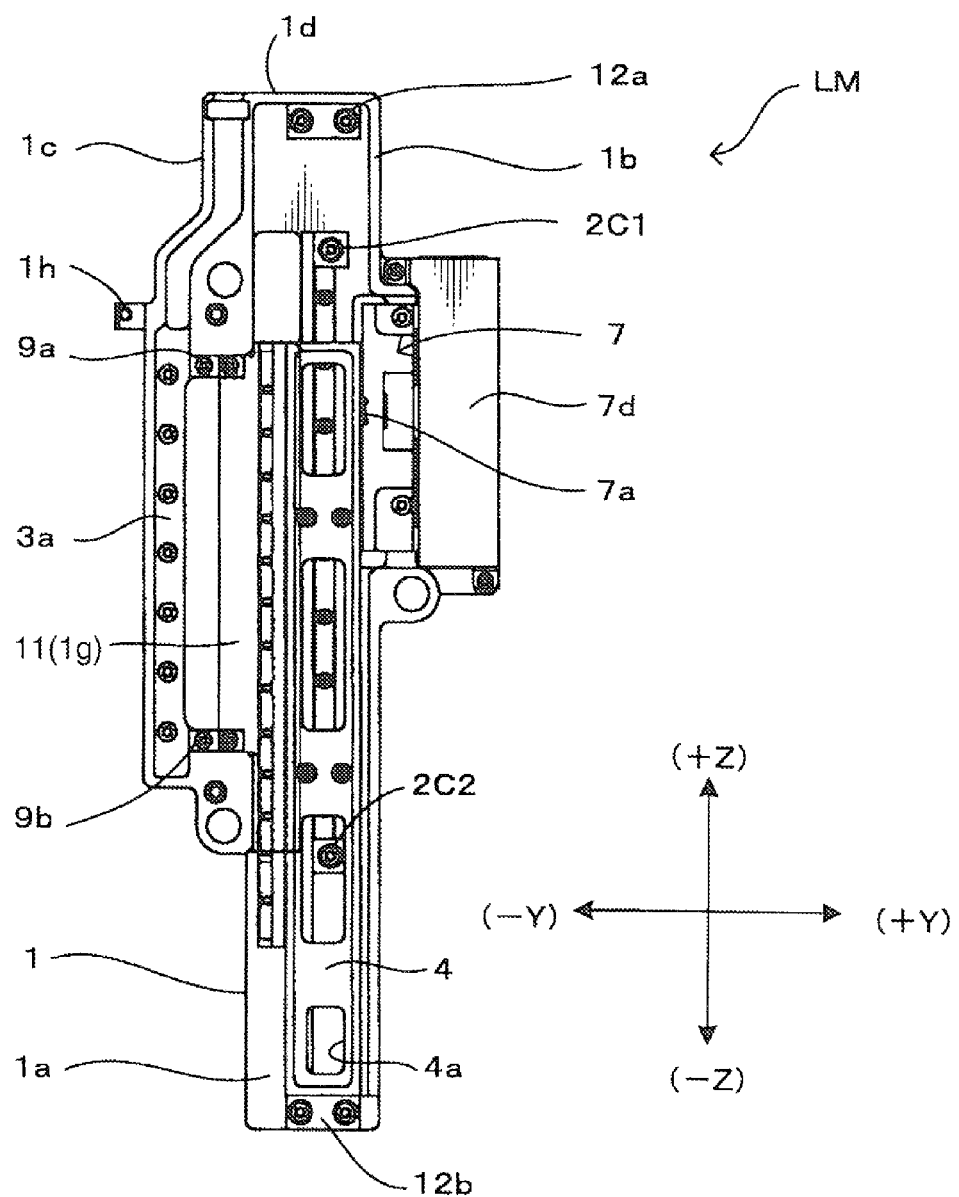
FIG. 9 is a front view showing an arrangement relationship between a magnetic plate and two sub-teeth in the single-shaft linear motor illustrated in FIG. 1.

In the first embodiment, the permanent magnet array 6 is used in the mover 10, and the core 3a made of a magnetic material is used in the armature 3 serving as the stator. Thus, a cogging force is generated between the tooth array of the core 3a and the permanent magnet array 6 of the mover 10. As is well known, "the generation of a cogging force" is a phenomenon that a magnetic flux density of the permanent magnet array 6 is changed depending on a position of the teeth of the core 3a, and thereby magnetic energy is changed to cause a pulsation of electromagnetic force acting on the armature 3. Therefore, in order to reduce a cogging force, two sub-teeth 9a, 9b each made of a magnetic material are provided at respective opposite ends of the tooth array of the armature 3, as shown in FIG. 9. Specifically, the sub-tooth 9a and the sub-tooth 9b are detachably provided on the base surface 1a of the base plate 1, respectively, at a desired position identical to or different from a tooth array pitch, on the backward side (+Z side) of the tooth array, and a desired position identical to or different from the tooth array pitch, on the forward side (−Z side) of the tooth array, in such a manner that a distance from the permanent magnet array 6 becomes a desired value.

In the single-shaft linear motor LM formed in the above structure, maldistribution of magnetic flux density may occur due to a magnetic coupling between the core 3a of the armature 3 and each of the sub-teeth 9a, 9b caused by a plate region, connected to the core 3a, which extends to a vicinity of the sub-teeth 9a, 9b. Thus, it is likely that a stable cogging-force reducing function cannot be obtained simply by arranging the sub-teeth 9a, 9b at given positioning. In particularly, there is likelihood that reducing effect by the sub-teeth 9a, 9b is not always obtained in situation during acceleration or deceleration, or in a situation where an operating condition (a constant movement speed after acceleration) itself changes. In those situations, an amount of current flowing through the coils 3c is likely to change and deviate from an assumed value to cause difficulty in desirably forming a magnetic pole of a counter surface of the sub-teeth 9a, 9b opposed to the permanent magnet array 6 or an intensity of the magnet pole. Therefore, in the first embodiment, a magnetic plate 11 is provided between the base plate 1 and each of the sub-teeth 9a, 9b to supplement the cogging-force reducing effect based on the sub-teeth 9a, 9b. More specifically, the single-shaft linear motor is designed as follows.

Referring to FIGS. 5 and 9, a plate-fitting portion 1g, which has a shape approximately equal to a planar shape of the magnetic plate 11 (see FIG. 5), is formed on the base surface 1a of the base plate 1. The plate-fitting portion 1g is formed in a position where the magnetic plate 11 is disposed opposed to both the mover 10 and the armature 3 in the frontward-rearward direction X. As shown in FIG. 2, when the magnetic plate 11 is fitted in the plate-fitting portion 1g, a front surface of the magnetic plate 11 is flush with the base surface 1a. The magnet plate 11 provided in the above manner makes it possible to effectively reduce the cogging force by generating not only magnetic flux on the Y-Z plane, which passes through the core 3a, the sub-tooth 9a, one permanent magnet in the permanent magnet array 6, the yoke 5, an adjacent permanent magnet in the permanent magnet array 6, and an adjacent one of the teeth and reaching the core 3a, but also magnet flux on the X-Y plane, which passes through the sub-tooth 9a, one permanent magnet in the permanent magnet array 6, the yoke 5, and the magnetic plate 11, and reaching the sub-tooth 9a.

As above, the movable base 4 is driven in the moving direction Z by interaction of magnetic fluxes generated between the mover 10 and the armature 3. To prevent the movable base 4 from being moved beyond a given moving range, two movement restriction stoppers 12a, 12b are detachably fixed to the base surface 1a of the base plate 1.

Next, with a view to accurately detecting a position of the movable base 4, a detector unit 7 having a sensor 7a and a linear scale 7b to serve as detection means is provided on a side opposite to the armature (i.e., on the +Y side) with respect to the movable base 4.

Referring to FIGS. 2 and 5, the sensor 7a of the detector unit 7 is integrally assembled to a sensor control unit 7c. This assembly (the sensor 7a+the sensor control unit 7c) is adapted to be detachable relative to the recess portion 1e through a cutout 1f formed in the standing wall 1b, as shown in FIG. 5. In the mounted assembly, the sensor 7a faces inside the recess portion 1e of the base plate 1, while the sensor control unit 7c, which is disposed on a side opposite to the linear scale or on the other edge side (+Y side) in the widthwise direction Y with respect to the sensor 7a, is attached to the base plate 1.

The linear scale 7b is provided on a lateral surface of the movable base 4 on the other edge side (+Y side) to extend along the moving direction Z. The sensor 7a is disposed opposed to the linear scale 7b in the widthwise direction Y after the operation of mounting the assembly (the sensor 7a+the sensor control unit 7c). Particularly, in the first embodiment, respective mounting positions of the sensor 7a and the linear scale 7b are set such that each of a surface 7e of the linear scale 7b and a sensing surface 7e' of the sensor 7a opposed to the surface 7e becomes parallel to the X-Z plane including the frontward-rearward direction X and the moving direction Z, as shown in FIG. 4. This makes it possible to allow a region of the linear scale 7b opposed to the sensor 7a to be displaced in response to a displacement of the movable base 4 along the moving direction Z, and to accurately detect a position of the movable base 4 in the moving direction Z based on the displacement of the region of the linear scale 7b.

In order to prevent foreign substances, such as dust or foreign particles, from getting into the sensor control unit 7c, a sensor cover 7d (see FIG. 2) is attached to the standing wall 1b of the base plate 1 after the mounting of the assembly to cover the sensor control unit 7c.

In the first embodiment, the linear scale 7b is attached to the movable base 4, while the sensor 7a is disposed on the base plate 1. Alternatively, the sensor 7a and the linear scale 7b may be arranged in the reverse relation. Also, the detector unit 7 may be configured such that one of the elements (the sensor 7a and the linear scale 7b) thereof is attached to the sliders 2b1, 2b2, instead of attaching it to the movable base 4. A detection scheme of the detector unit 7 may be a magnetic scheme using magnetism, or may be an optical scheme.

As above, in the single-shaft linear motor LM according to the first embodiment, each of the standing walls 1b, 1c extends from a respective one of the opposite edges of the base plate 1 in the widthwise direction Y toward the frontward side with respect to the base surface 1a, as shown in FIG. 5, so that the recess portion 1e surrounded by the standing walls 1b, 1c and the base surface 1a is defined as the containing space opened toward the frontward side with respect to the base surface 1a. The opening of the base plate 1 defined in this manner has broadening in the moving direction Z and the widthwise direction Y, so that an operator can access the recess portion 1e (containing space) from the frontward side through the opening. This also facilitates visual check during assembling to allow an operator to readily check a positional relationship between the stator and the mover, so that, as is clear from FIG. 5, any elements of the linear motor LM can be readily inserted into the recess portion 1e through the opening. Thus, in the first embodiment, a production/assembling operation of the linear motor LM can be facilitated. Also, in a maintenance operation, such as maintenance and repair, for the linear motor LM, a service person can readily access the elements of the linear motor LM through the opening to provide excellent maintenance serviceability.

In an assembling process of the linear motor LM formed in the above structure, the linear guide 2 extending along the moving direction Z is first set up on the base surface 1a, and the movable base 4 is then attached to the sliders 2b1, 2b2 of the linear guide 2, wherein the sliders 2b1, 2b2 and the movable base 4 make up the "movable section" in the appended claims. On the other hand, the armature 3, which is equivalent to the "stator" in the appended claims, is provided on the base surface 1a to extend in the moving direction Z. In this arrangement, the armature 3 faces the mover 10, which is attached to the movable base 4 to extend in the moving direction Z, so as to have a distance apart from the mover 10 toward the one edge side (or −Y side) in the widthwise direction Y. Thus, an operator can set up the armature 3 and the mover through the opening, checking a relative positional relationship therebetween. This makes it possible to adjust relative position (alignment) therebetween with a high degree of accuracy and readily produce a high-performance single-shaft linear motor LM.

In the first embodiment, the plurality of standing walls 1b to 1d including the standing walls 1b, 1c are integrally formed with the base plate 1, so that the rigidity of the base plate 1 is improved. Also, all of the movable section (sliders 2b1, 2b2), the stator (armature 3), and the mover 10 are set up in the internal space (containing space) of the recess portion 1e. By employing these structures, the strength of the single-shaft linear motor LM is improved. In addition to the aspect of strength, the formation of the standing walls 1b to 1d also contributes to effectively preventing entry of foreign substances from outside the motor.

A standing wall may be formed on the entire peripheral edge of the base plate 1. In this case, however, design of sizes of the linear guide 2 and the movable base 4 in the moving direction, a moving range of the movable section, etc., will be significantly restricted by the presence of opposite walls located on the forward and backward sides in the moving direction Z. Moreover, a position for coupling a driven object to the movable base 4 will be limited to the frontward side. In the first embodiment, in contract, the open zone 1j is defined at the forward-side (−Z side) end of the base plate 1, so that the internal space (containing space) of the recess portion 1e is opened through the open zone 1j. By providing the open zone 1j in this manner, a driven object (such as an after-mentioned nozzle shaft) coupled by the forward-side (−Z side) end or the female screw portions 4b can be moved to get in and out of the internal space of the recess portion 1e according to driving of the movable base 4 in the moving direction Z. This makes it possible to expand the moving range of the movable base 4 (and the driven object coupled to the movable base 4) in the moving direction Z to obtain a single-shaft linear motor having high versatility.

In the first embodiment, a depth dimension (size between the base surface 1a and a top in the frontward-rearward direction X) of each of the standing walls 1b to 1d is set such that the internal space of the recess portion 1e can accommodate entirely all of the assembled movable section (sliders 2b1, 2b2), the stator (armature 3), and the mover 10. Thus, the movable section (sliders 2b1, 2b2), the stator (armature 3), and the mover 10 are accommodated in the bottom of the containing space. This makes it possible to prevent interference between the single-shaft linear motor LM and an element other than the motor. For example, in an after-mentioned multi-shaft linear motor MLM, or the after-mentioned surface mounter MT, a plurality of the single-shaft linear motors LM according to the first embodiment are arranged by stacking in the frontward-rearward direction. Even if such a stacking structure is employed, a plurality of the movable sections can be driven in the moving direction Z without mutual interference.

In the first embodiment, the single-shaft linear motors LM is adapted to allow the movable base 4 to be moved in the moving direction Z by the single linear guide 2. This makes it possible to have a simplified structure and a reduced size in the widthwise direction Y.

In the first embodiment, the armature 3, the permanent magnet array 6, the yoke 5, and the movable base 4 are arranged in the widthwise direction Y, as shown in FIG. 2, so that a thickness of the linear motor LM (apparatus size in the direction X) is significantly reduced as compared with cases where the armature, the permanent magnet array, the yoke and the movable base are arranged in the direction X with respect to the base plate.

The linear motor of the present invention is not limited to the above embodiment, but various changes and modifications other than those described above may be made therein without departing from the spirits and scope of the invention.

For example, although the detector unit 7 in the first embodiment is provided to allow each of the opposed surfaces 7e, 7e' of the linear scale 7b, and the sensor 7a to become parallel to the X-Z plane including the frontward-rearward direction X and the moving direction Z as shown in FIG. 4, the structure of the detector unit 7 is not limited thereto.

In the first embodiment, the mover and the armature (stator) 3 are disposed only on the one edge side (−Y side) in the widthwise direction Y with respect to the movable base 4 to drive the movable base 4. Alternatively, the mover and the armature (stator) 3 may be additionally be disposed on the other edge side (+Y side) in the widthwise direction Y with respect to the movable base 4. This makes it possible to further increase a propulsion force for driving the movable base 4.

Figure 10:
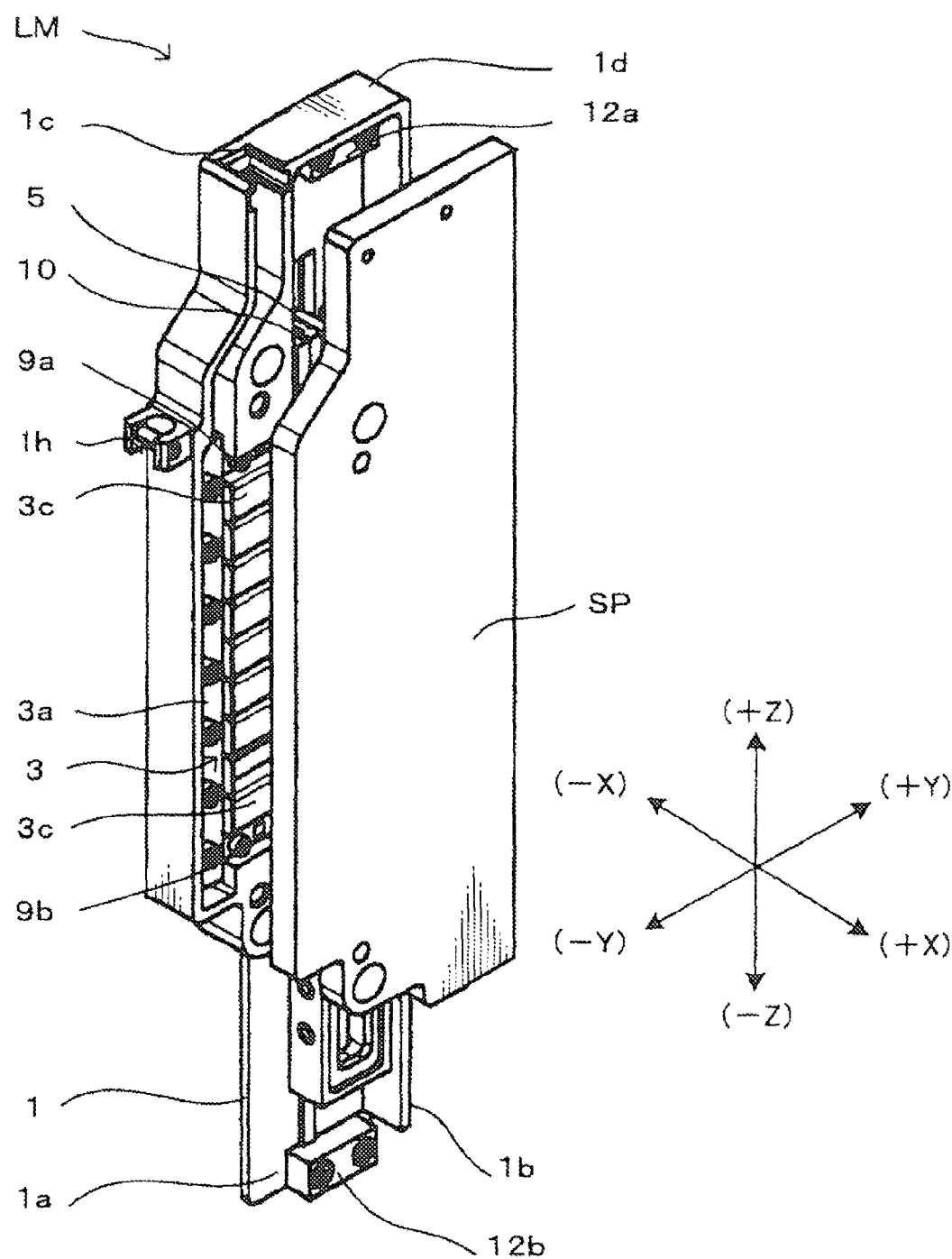
FIG. 10 is an exploded perspective view of a single-shaft linear motor according to another embodiment of the present invention.

In the first embodiment, the linear motor LM is adapted to operate under the condition that the base plate 1 is kept unclosed on the frontward side thereof. To close the internal space (containing space) of the recess portion 1e from the frontward side, a cover member SP, which is shown as an example in FIG. 10 (a second embodiment of the present invention), may alternatively be disposed on a front surface of the linear motor LM and attached to tops of the standing walls 1b to 1d to cover the movable section (sliders 2b1, 2b2), the stator (armature 3), and the mover 10 each inserted and set up in the internal space. By attaching the cover member SP, it becomes possible to effectively prevent entry of foreign substances from outside the motor, and prevent interference between the single-shaft linear motor LM and an element other than the motor.

In the first and second embodiments, the yoke 5 is attached to the lateral surface of the movable base 4 on the first end side in the widthwise direction Y after the movable base 4 is fixed to the sliders 2b1, 2b2, and then the permanent magnet array 6 is attached to the yoke 5. Alternatively, a magnetic circuit may be designed such that the movable base 4 is made of a ferromagnetic material, and the permanent magnet array 6 is provided directly on the lateral surface of the movable base 4 in the widthwise direction Y. Also, in the first embodiment, the yoke 5 may be attached to respective lateral surfaces of the sliders 2b1, 2b2 on the one of edge sides in the widthwise direction Y, and then the permanent magnet array 6 may be attached to the yoke 5. In this case, the sliders 2b1, 2b2 are equivalent to the "movable section" in the appended claims. Furthermore, a magnetic circuit may be designed such that the sliders are made of a ferromagnetic material, and the permanent magnet array 6 is provided directly on respective lateral surfaces of the sliders on the one of edge sides in the widthwise direction Y to extend in the direction Z.

In the first and second embodiments, the mover is made up using the permanent magnet array 6, and the stator is made up using the armature 3. Alternatively, the present invention may be applied to a single-shaft linear motor comprising a mover made up using an armature, and a stator made up using a permanent magnet array.

Also, the sectional shape of the movable base 4 may be an H shape.

Each of the first and second embodiments relates to a so-called single-shaft linear motor. In another aspect, two single-shaft linear motors LM1, LM2 may be assembled together to form a multi-shaft linear motor MLM, as shown in FIGS. 11 and 12.

Figure 11:
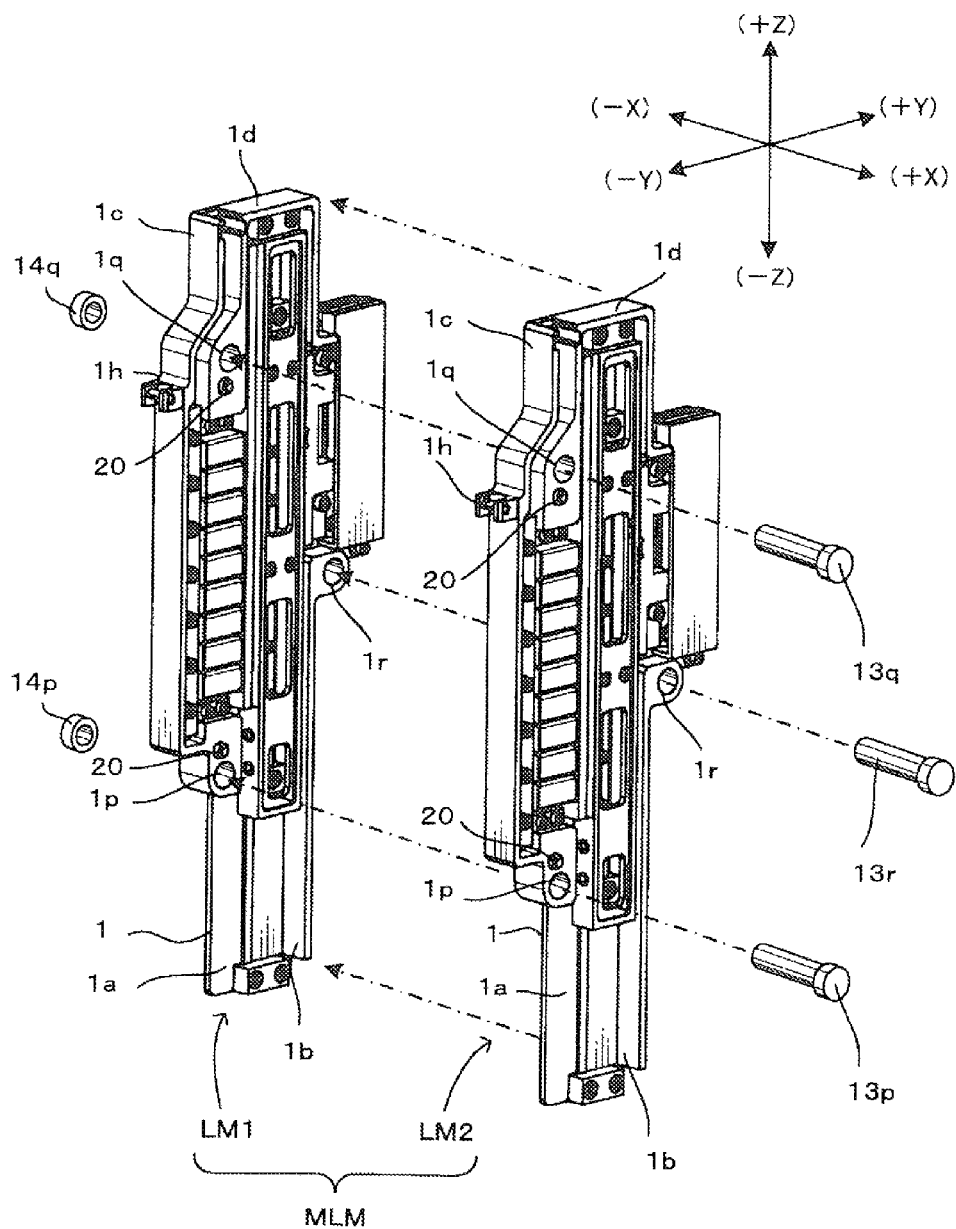
FIG. 11 is a perspective view showing a pre-assembled state of a multi-shaft linear motor according to yet another embodiment of the present invention.
Figure 12:
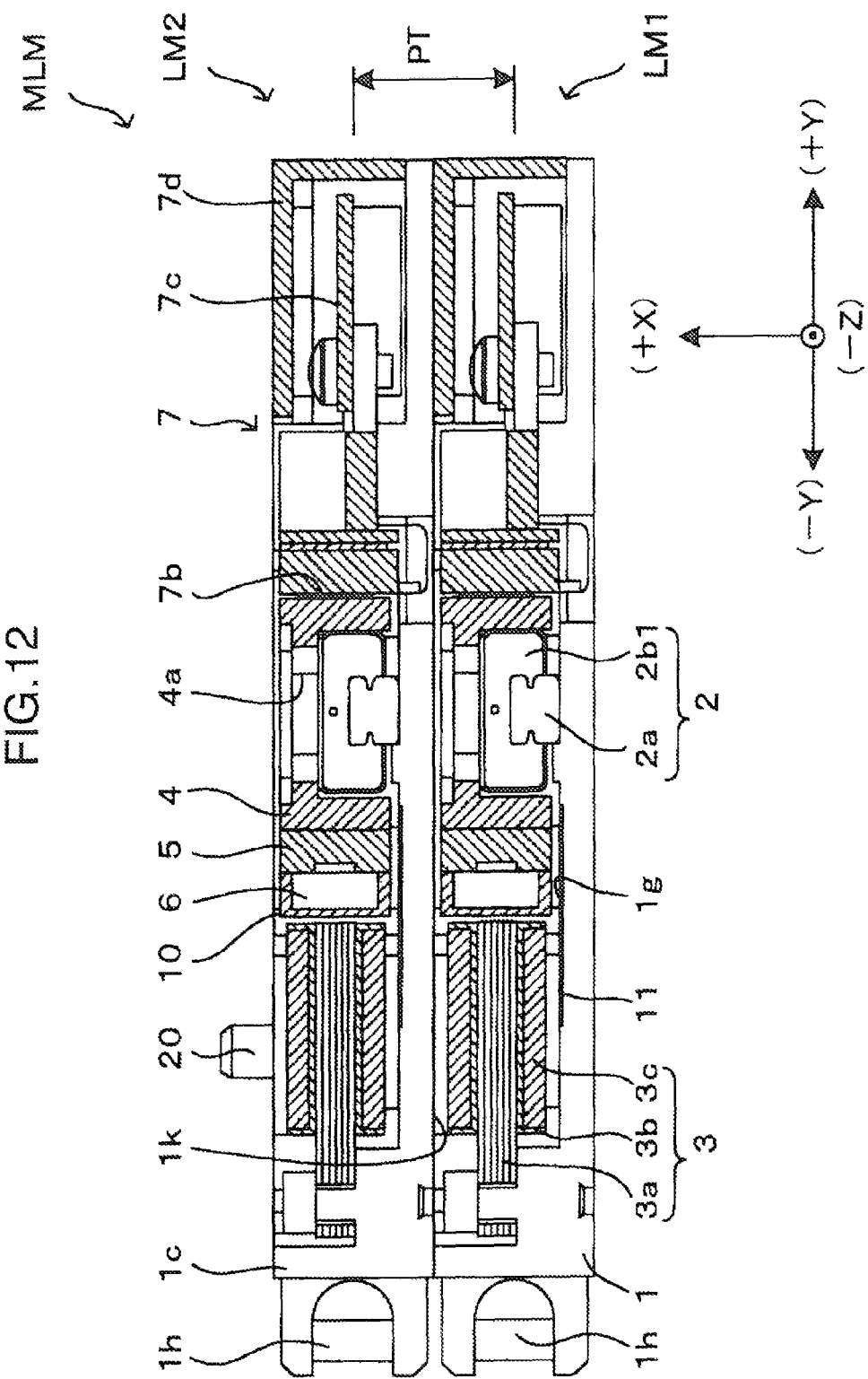
FIG. 12 is a sectional view showing an assembled state of the multi-shaft linear motor in FIG. 11.

In a third embodiment of the present invention illustrated in FIGS. 11 and 12, two single-shaft linear motors LM1, LM2, each of which has the same structure as that of the single-shaft linear motor according to the first embodiment, are prepared to form a multi-shaft linear motor MLM. Specifically, the single-shaft linear motors LM1, LM2 are arranged to be stacked in the frontward side (+X side) direction in such a manner that respective tops of the standing walls 1b to 1d (a front surface) of one LM1 of the single-shaft linear motors are brought into contact with a rear surface of the base plate 1 of the other linear motor LM2.

Two through-holes 21 (see FIG. 5) are formed in respective ones of the base plates 1 of the single-shaft linear motors LM1, LM1 so as to provide two pairs of through-holes 21 opposed to each other in the frontward-rearward direction X. Remaining some space on a bottom side of each of the through-holes 21, two positioning pins 20 are fixed to respective ones of the two pairs of through-holes 21. A portion of each of the fixed positioning pins 20 on the frontward side (+X side) protrudes from the through-hole 21. Thus, in an assembling of the two single-shaft linear motors LM1, LM2, the two positioning pins 20 on a lower-side one LM1 of the single-shaft linear motors LM1, LM2 fit into respective ones of the through-holes 21 in a upper-side one LM2 of the single-shaft linear motors LM1, LM2 to establish positioning. Also, three through-holes 1p to 1r are formed in respective ones of the base plates 1 of the single-shaft linear motors LM1, LM2 so as to provide three pairs of through-holes 1p to 1r opposed to each other in the frontward-rearward direction. A bolt 13p is inserted into the pair of through-holes 1p in the single-shaft linear motors LM1, LM2 from the frontward side (+X side) with respect to the single-shaft linear motor LM2 to penetrate therethrough, and a nut 14p is screwed on a distal end of the bolt 13p from the rearward side (−X side) with respect to the single-shaft linear motor LM1. As for the rest pairs of through-holes 1q, 1r, an operation of inserting each of two bolts 13q, 13r and an operation of screwing a nut are performed in the same manner as that for the pair of through-holes 1p. As above, the single-shaft linear motors LM1, LM2 are fastened to each other and integrated together to form a two-shaft linear motor MLM.

In the two-shaft linear motor MLM formed in the above structure, the pair of thin linear motors LM1, LM2 according to the first embodiment are arranged by stacking in the frontward-rearward direction X, so that a pitch of two shafts in the frontward-rearward direction X can be set to a small value. Also, in each of the single-shaft linear motors LM1, LM2, a depth dimension of the entire elements, such as the mover and the armature (stator), is equal to or less than that of the standing walls 1b to 1d of the base plate 1, and major elements (the movable section, the armature 3 and the mover 10) of the linear motor is accommodated within a bottom side of the recess portion 1e surrounded by the base surface 1a and the standing walls 1b to 1d. This makes it possible to easily perform a motor assembling operation, maintaining accuracy of relative position of the two shafts at high levels.

The multi-shaft linear motor MLM is formed such that the two single-shaft linear motors LM each formed in the above structure are arranged by stacking in the stacking direction, so that the two movable sections can be driven in the moving direction Z separately and independently without mutual interference. As a result of employing this stacking structure, the internal space (containing space) of the recess portion 1e of the lower-side single-shaft linear motors LM1, located on the lower-side in the stacking direction, is covered by a back surface 1k, which is a surface on a side opposite to the base surface of the base plate 1 of the upper-side single-shaft linear motor LM2 located on a upper-side of, and in adjacent relation to, the lower-side single-shaft linear motors LM1. Thus, the recess portion 1e of the lower-side single-shaft linear motors LM is sealed by the upper-side single-shaft linear motors LM, which makes it possible to effectively prevent entry of foreign substances into the internal space (containing space) of the recess portion 1e. To close the internal space (containing space) of the recess portion 1e from the frontward side in the third embodiment, a cover member SP (see FIG. 10) may be disposed on the upper-side (+X side) with respect to the upper-side single-shaft linear motors LM2 and attached to tops of the standing walls 1b to 1d to cover the elements contained and set up in the internal space such as the movable section (sliders 2b1, 2b2), the stator (armature 3), and the mover 10. By the attachment, the cover member SP enables to effectively prevent foreign substances from entering in the upper-side single-shaft linear motors LM2.

In the above multi-shaft linear motor MLM, two single-shaft linear motors LM according to the first embodiment are assembled together. Alternatively, two single-shaft linear motors LM according to the second embodiment FIG. 10 may be assembled together. Alternatively, the single-shaft linear motor LM according to the first embodiment (FIG. 1) and the single-shaft linear motor LM according to the second embodiment FIG. 10 may be arranged by stacking in the frontward-rearward direction to form a multi-shaft linear motor.

The number of single-shaft linear motors to be assembled together is not limited to two, but three or more single-shaft linear motors may be assembled together to form a multi-shaft linear motor MLM. For example, a surface mounter as described next is equipped with an upward/downward driving mechanism for driving each of ten suction nozzles in an upward-downward direction to transfer elements using the suction nozzles. In this case, a multi-shaft linear motor MLM comprising ten single-shaft linear motors LM1 to LM10 assembled together may be used as the upward/downward driving mechanism.

<Surface Mounter>

Figure 13:
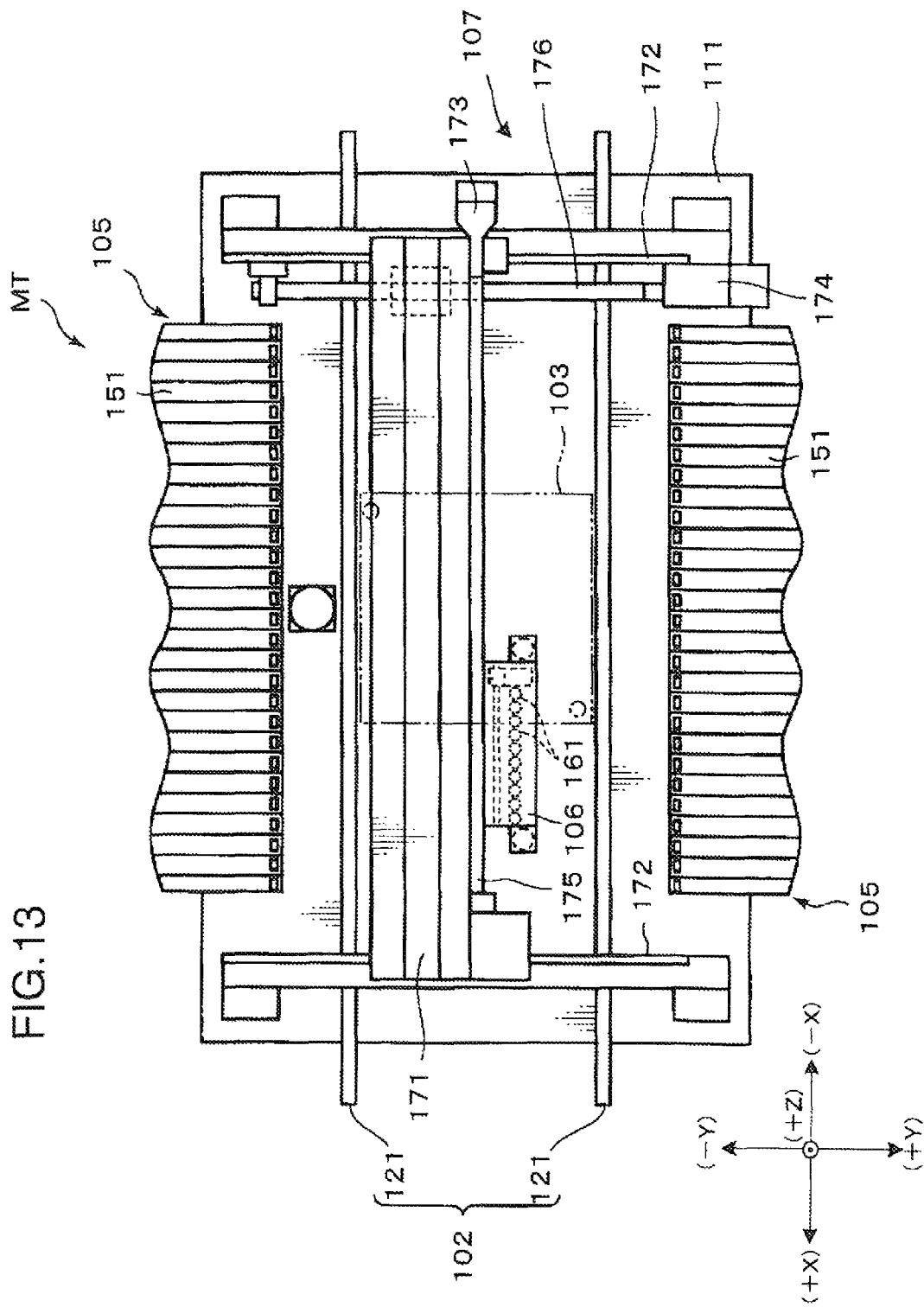
FIG. 13 is a top plan view showing a general structure on of a surface mounter which is one example of a component transfer apparatus, according to one embodiment of the present invention.
Figure 14:
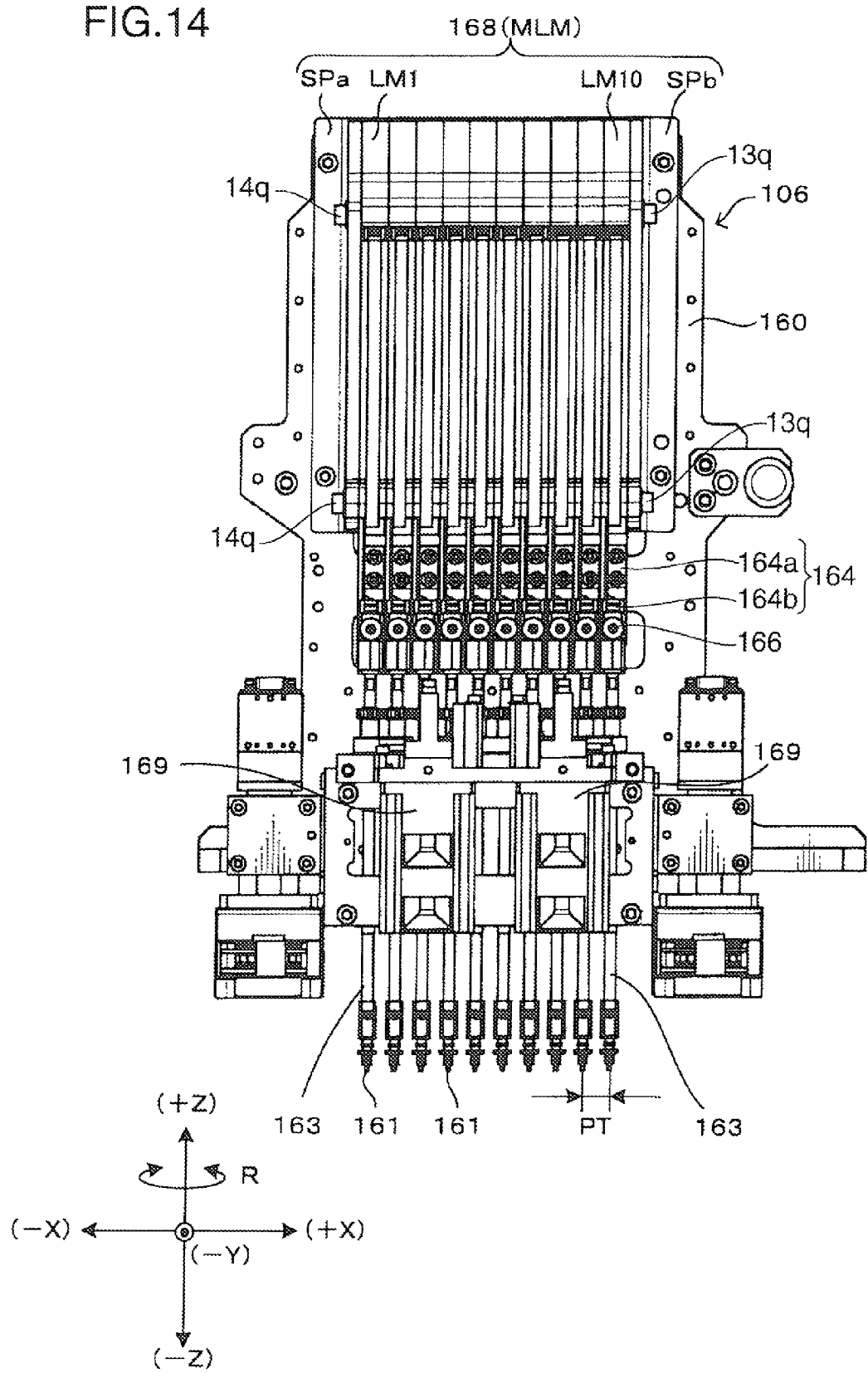
FIG. 14 is a front view of a head unit in the surface mounter illustrated in FIG. 13.
Figure 15:
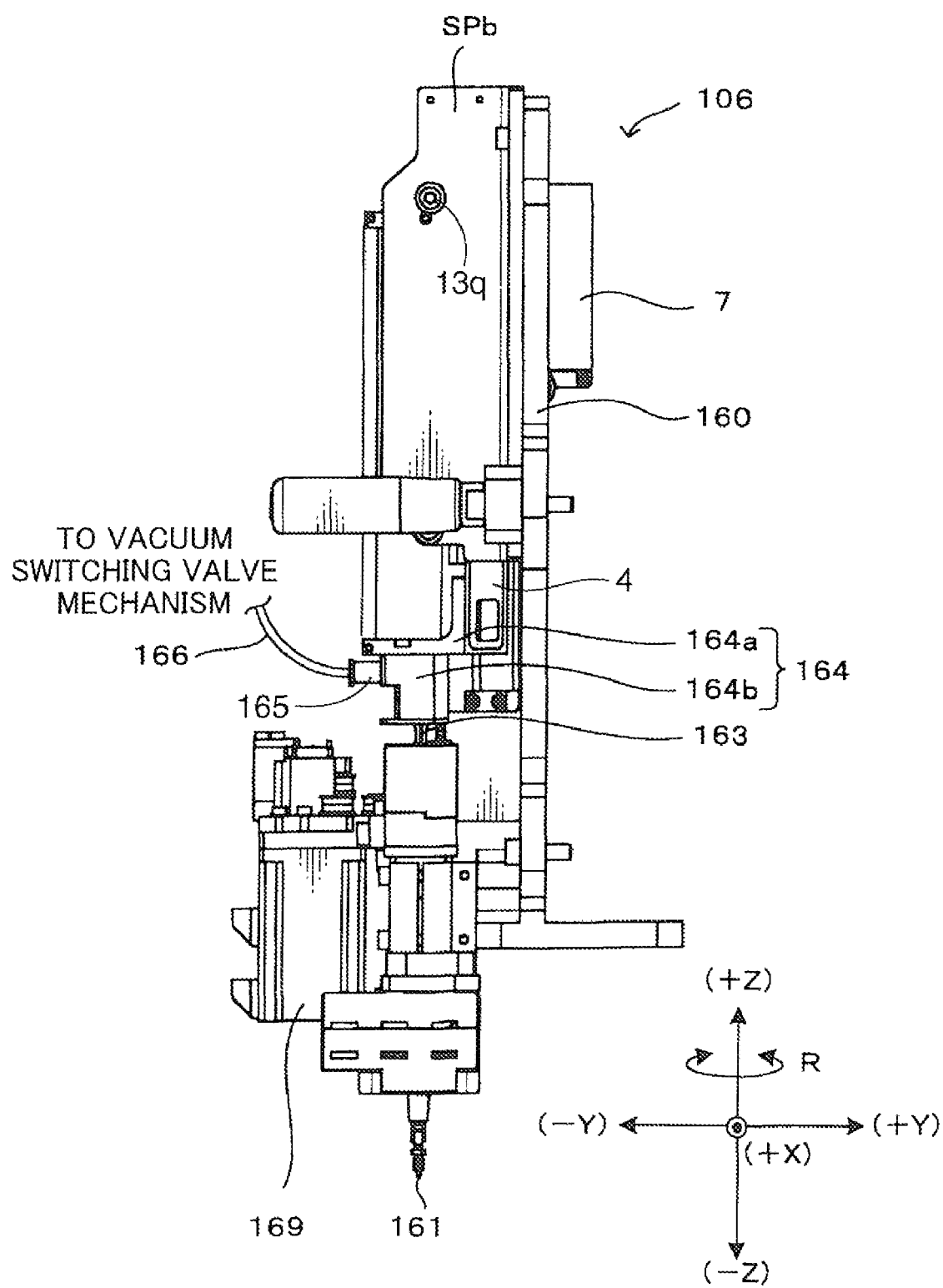
FIG. 15 is a side view of the head unit in the surface mounter illustrated in FIG. 13.
Figure 16:
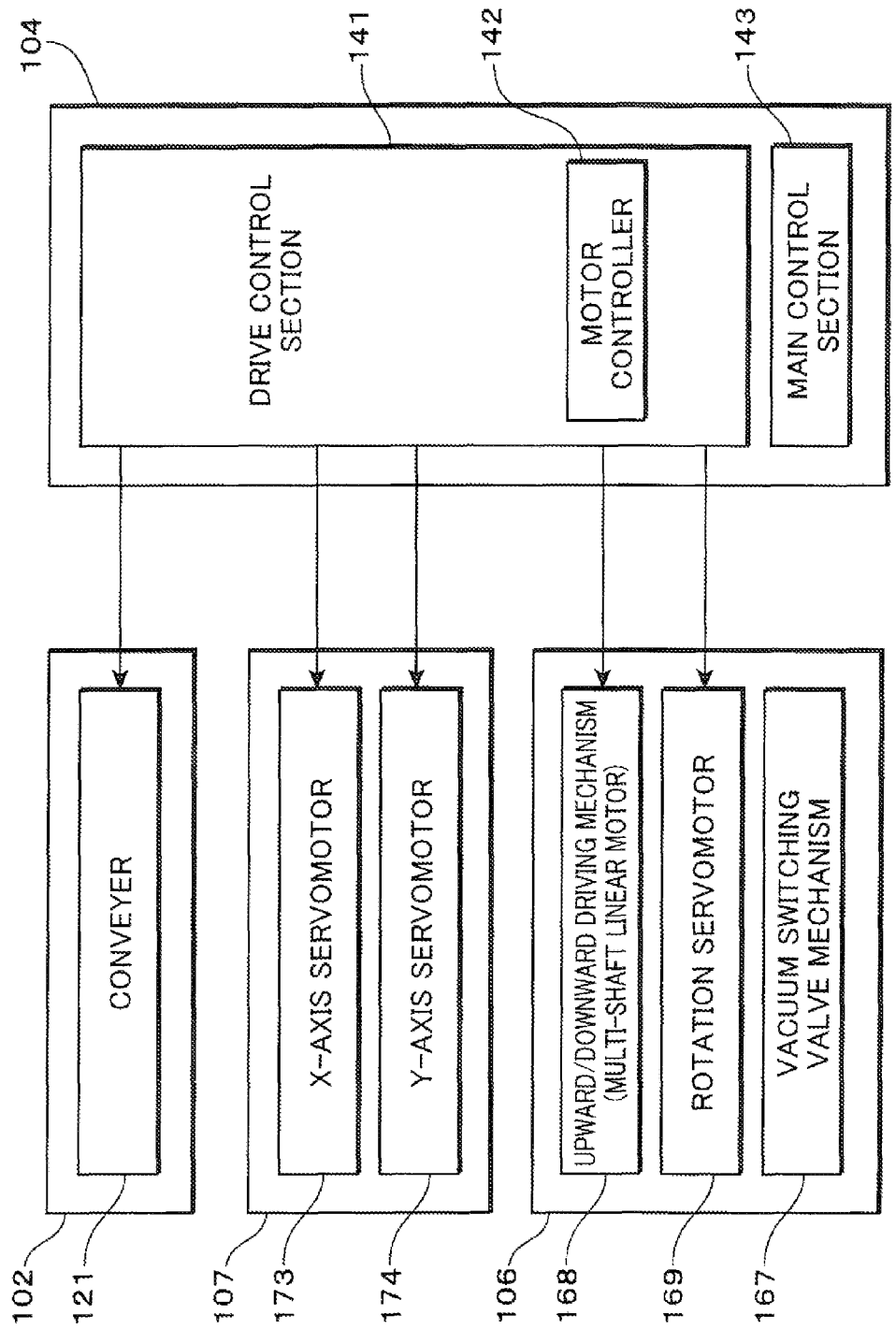
FIG. 16 is a block diagram showing an electrical configuration of the surface mounter illustrated in FIG. 13.

FIG. 13 is a top plan view showing a general structure of a surface mounter which is one example of a component transfer apparatus, according to one embodiment of the present invention. FIGS. 14 and 15 are front and side views of a head unit, respectively. FIG. 16 is a block diagram showing an electrical configuration of the surface mounter illustrated in FIG. 13. In these figures and subsequent illustrative figures, a three-dimensional-XYZ coordinate system in which a vertical direction is defined as the Z-axis, is employed. In a state after the linear motors LM1 to LM10 are set up in the surface mounter, the direction X, the direction Y and the direction Z are aligned with the X-axis, the Y-axis and the Z-axis.

In the surface mounter MT according to this embodiment, a board carrying mechanism 102 is installed on a base 111 to allow a board 103 to be carried in a given carrying direction. In the illustrated example, the carrying direction is along the X-axis direction. More specifically, the board carrying mechanism 102 comprises a pair of conveyers 121, 121 adapted to carry the board 103 in a direction from a right side to a left side in FIG. 13, on the base 111. These conveyers 121, 121 are controlled by a drive control section 141 of a control unit 104 adapted to control the entire surface mounter MT. Specifically, the conveyers 121, 121 are operable, in response to a drive instruction from the drive control section 141, to carry in the board 103 and then stop the carried-in board 103 at a given mounting-operation position (a position of the board 103 indicated by the two-dot chain line in FIG. 13). The board 103 carried in this manner is fixedly held by a holding device whose illustration is omitted. Then, an electronic component (whose illustration is omitted) supplied from a component containing section 105 is transferred to the board 103 by a suction nozzle 161 equipped in a head unit 106. After completion of a mounting operation for all of a plurality of elements to be mounted on the board 103, the board carrying mechanism 102 is operable, in response to a drive instruction from the drive control section 141, to carry out the board 103.

The component containing section 105 is disposed on each of opposite sides of the board carrying mechanism 102. Each of the component containing sections 105 comprises a large number of tape feeders 151. Each of the tape feeders 151 is provided with a reel (whose illustration is omitted) wound with a tape which accommodates/contains therein a plurality of electronic components, and adapted to supply the electronic components. Specifically, a plurality of small-piece chip electronic components, such as integrated circuits (ICs), transistors, resistors, or capacitors, are accommodated and contained in each of the tapes with certain intervals therebetween. When the tape feeder 151 reels the tape out from the reel toward the head unit 106 along the Y-axis direction, the electronic components in the tape are intermittently fed out to allow the suction nozzle 161 of the head unit 106 to perform an operation of picking up the electronic component.

In this embodiment, in addition to the board carrying mechanism 102, a head driving mechanism 107 is provided. The head driving mechanism 107 is designed to move the head unit 106 in the X-axis direction and the Y-axis direction over a given range of the base 111. An electronic component sucked by the suction nozzle 161 is carried from a position just above the component containing section 105 to a position just above the board 103 by the movement of the head unit 106. Specifically, the head driving mechanism 107 comprises a mounting head-support member 171 extending along the X-axis direction. The mounting head-support member 171 supports the head unit 106 in a movable manner in the X-axis direction. Also, the mounting head-support member 171 are supported at the opposite ends in the X-axis direction by a fixed rail 172 extending in the Y-axis direction, so that the mounting head-support member 171 can be moved in the Y-axis direction along the fixed rail 172. The head driving mechanism 107 also comprises an X-axis servomotor 173 serving as a driving source for driving the head unit 106 in the X-axis direction, and a Y-axis servomotor 174 serving as a driving source for driving the head unit 106 in the Y-axis direction. The servomotor 173 is coupled to a ball screw 175, so that, when the servomotor 173 operates in response to an operation instruction from the drive control section 141, the head unit 106 is driven back and forth along the X-axis direction through the ball screw 175. The servomotor 174 is coupled to a ball screw 176, so that, when the servomotor 174 operates in response to an operation instruction from the drive control section 141, the mounting head-support member 171 is driven back and forth along the Y-axis direction through the ball screw 176.

Owing to the head driving mechanism 107, the head unit 106 carries the electronic component to the board 103 and transfer the electronic component to a given position while the suction nozzles 161 suck and hold the electronic components (a component transfer operation). More specifically, the head unit 106 is configured as follows. In the head unit 106 in this embodiment, ten mounting heads each extending in the vertical direction Z are arranged in a line at even intervals in the X-axis direction (the carrying direction of the board 103 by the board carrying mechanism 102). Each tip of the mounting heads is equipped with the suction nozzle 161. As shown in FIGS. 14 and 15, each of the mounting heads comprises a nozzle shaft 163 extending in the Z-axis direction. The nozzle shaft 163 has an air passage formed at the core thereof to extend in an upward direction (+Z side) along an axis thereof. The nozzle shaft 163 has a lower end communicating with the air passage through the suction nozzle 161 connected to the lower end. The upper end is opened and connected to a vacuum suction source and a positive pressure source, through a coupling unit 164, a connection member 165, an air pipe 166, and a vacuum switching valve mechanism 167.

In the head unit 106, an upward/downward driving mechanism 168 is provided to move the nozzle shaft 163 up and down in the Z-axis direction. The upward/downward driving mechanism 168 is operable, under drive-control by a motor controller 142 of the drive control section 141, to move the nozzle shaft 163 up and down along the Z-axis direction to move the suction nozzle 161 in the Z-axis direction and then set the suction nozzle 161 at a given position. In this embodiment, a multi-shaft linear motor MLM comprising ten single-shaft linear motors LM1 to LM10 assembled together is used as the upward/downward driving mechanism 168. Details of this structure will be described later.

Also, a rotation servomotor 169 is provided to rotate the suction nozzle 161 in an R direction (two-way) in the X-Y plane (about the Z-axis). The rotation servomotor 169 is operable, based on an operation instruction from the drive control section 141 of the control unit 104, to rotate the suction nozzle 161 in the R direction. Thus, the head unit 106 is moved to the component containing section 105 by the head driving mechanism 107 in the above manner, and then the upward/downward driving mechanism 168 and the rotation servomotor 169 are driven to bring a distal end of the suction nozzle 161 into contact with the electronic component supplied from the component containing section 105, in an adequate posture.

Figure 17:
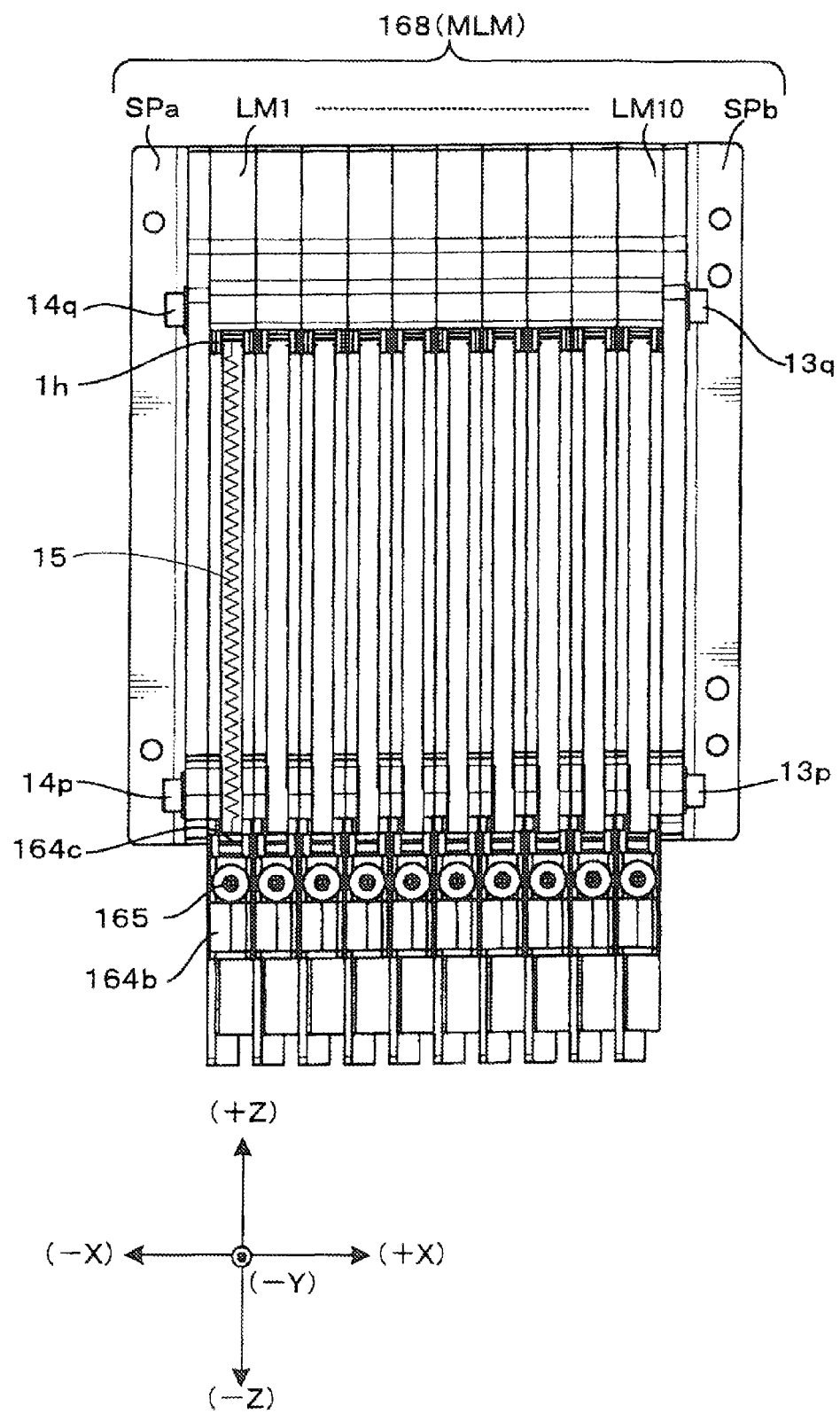
FIG. 17 is a front view showing a structure of an upward/downward driving mechanism in the surface mounter illustrated in FIG. 13.
Figure 18:
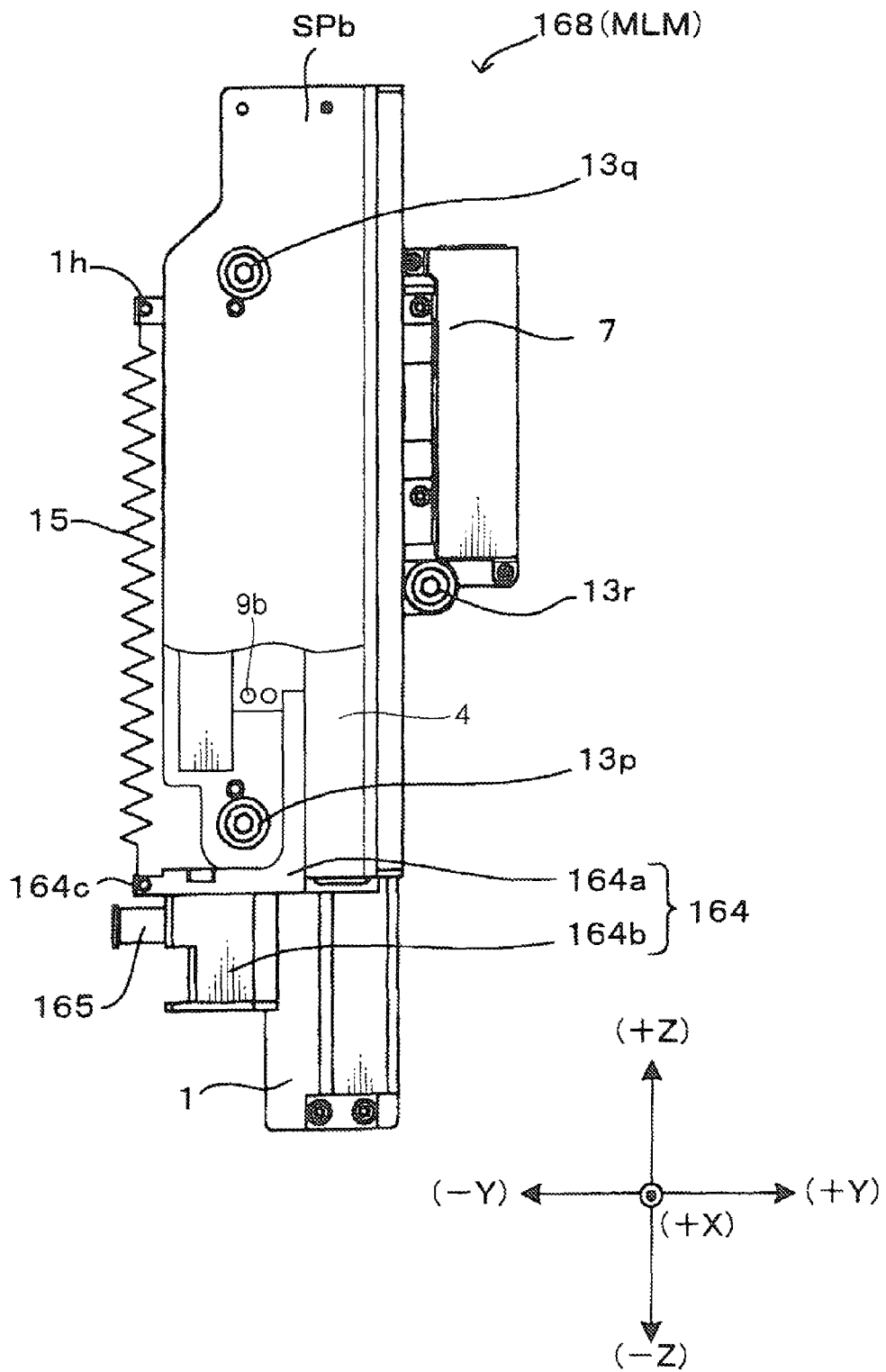
FIG. 18 is a side view showing the structure of the upward/downward driving mechanism in the surface mounter illustrated in FIG. 13.

Referring to FIGS. 17 and 18, the multi-shaft linear motor MLM used as the upward/downward driving mechanism 168 comprises ten single-shaft linear motors LM1 to LM10, and two cover members SPa, SPb. Each of the single-shaft linear motors LM1 to LM10 is equivalent of the single-shaft linear motor LM described in connection with FIG. 1, and the single-shaft linear motors LM1 to LM10 are arranged by stacking in the X-axis direction in the manner described in connection with FIGS. 11 and 12. The cover member SPb provided on a topmost side (+X side) also functions as a cover covering a recess portion 1e (see FIG. 5) of the topmost single-shaft linear motor LM10.

As above, in this embodiment, the ten single-shaft linear motors LM1 to LM10 are laminated. Among the single-shaft linear motors LM1 to LM10, the single-shaft linear motor LM10 located on the topmost side (+X side) corresponds to a "topmost single-shaft linear motor" in the appended claims, and the cover member SPb covering the opening of the single-shaft linear motor LM10 corresponds to a "cover member" in the appended claims.

The single-shaft linear motors LM1 to LM10 arranged side by side along the X-axis are sandwiched between the two cover members SPa, SPb. Each of the cover members SPa, SPb and the single-shaft linear motors LM1 to LM10 have three fastening through-holes each formed at a predetermined position to penetrate therethrough along the X-axis direction. Three bolts 13p to 13r are inserted into respective ones of the fastening through-holes from the side of the cover member SPb to penetrate therethrough in the X-axis direction, and fastened by respective ones of three nuts screwed thereon from the side of the cover member SPa, so that the cover member SPa, the single-shaft linear motors LM1 to LM10, and the cover member SPb are integrated together to form the multi-shaft linear motor MLM. The cover member SPa is disposed (on the bottom (−X side) linear motor LM1), and the cover member SPb is disposed on the top (+X side) linear motor LM10.

As shown in FIGS. 14 and 15, the multi-shaft linear motor MLM is attached to a base member 160 of the head unit 106.

A coupling unit 164 is fixed to each of the movable bases 4 of the multi-shaft linear motor MLM to allow the nozzle shaft 3 to be coupled to a respective one of the movable bases 4.

As shown in FIGS. 14 and 15, the coupling unit 164 comprises an L-shaped block member 164a fixed to an end of the movable base 4 on the forward side (−Z side) in the moving direction Z, and a shaft holder 164b fixed to the block member 164a. In this embodiment, each of the members 164a, 164b is one example of a coupling member for coupling the nozzle shaft 163 as a driven object and the movable base 4 as a main element of the movable section.

The block member 164a integrally has a vertical portion extending upwardly along the Z-axis direction, and a horizontal portion extending from a lower end (the forward side (−Z side) in the moving direction Z) of the vertical portion toward the one edge side (−Y side) in the widthwise direction Y. The vertical portion of the block member 164a is fixed to the movable base 4 by a screw. The shaft holder 164b is attached to a lower surface (−Z side) of the horizontal portion of the block member 164a. Thus, the nozzle shaft 163 is integrally coupled to the movable base 4 of a corresponding one of the single-shaft linear motors LM1 to LM10 through the coupling unit 164, in an upwardly and downwardly movable manner along the Z-axis direction.

In this embodiment, the multi-shaft linear motor MLM is used as the upward/downward driving mechanism 168, and the moving direction Z of each of the movable bases 4 is set to be parallel to a vertical direction. Therefore, each of the movable bases 4 is constantly biased toward the forward side (−Z side) by gravity. For this reason, in each of the single-shaft linear motors LM1 to LM10, an upper end of a return spring 15 is engaged with the spring engagement portion 1h of the base plate 1, and a lower end of the return spring 15 is engaged with a spring engagement portion 164c provided on the horizontal portion of the block member 164a, so that the movable base 4 is biased toward the backward side (+Z side), i.e., upwardly, by the return spring 15. Thus, during stop of a current supply to the coils 3c of each of the single-shaft linear motors LM1 to LM10, the movable base 4 is accommodated inside the base plate 1. Consequently, each of the suction nozzles 161 is located at an upper position, which prevents each of the suction nozzles 161 or the electronic component sucked by the suction nozzle 161 from causing an accident of interference with the board 103, the conveyer 121 or the like, for example even if the X-axis servomotor 173 or the Y-axis servomotor 174 is activated under a condition that the upward/downward driving mechanism 168 is nonfunctional due to stop of a current supply.

As shown in FIG. 15, the connection member 165 is attached to a front surface (the −Y side in the widthwise direction Y) of the shaft holder 164b. One end of the air pipe 166 is connected to the connection member 165, to allow an air sent from the vacuum switching valve mechanism 167 through the air pipe 166 to be sent to the shaft holder 164b, and reversely allow an air from the shaft holder 164b to be sucked toward the vacuum switching valve mechanism 167 through the air pipe 166. As above, the vacuum switching valve mechanism 167 and each of the suction nozzles 161 are connected to each other by the following path: the air pipe 166—an air path (whose illustration is omitted) inside the shaft holder 164b—the nozzle shaft 163, to allow a positive pressure to be supplied to the suction nozzle 161, or reversely allow a negative pressure to be supplied to the suction nozzle 161.

In the surface mounter configured as above, exerting a program pre-stored in a memory of the control unit 104, a main control section 143 of the control unit 104 controls each section of the surface mounter to move back and forth the head unit 106 between a position just above the component containing section 105 and a position just above the board 103. Also, stopping at the position just above the component containing section 105, the head unit 106 controls the upward/downward driving mechanism 168 and the rotation servomotor 169 to bring, in an adequate posture, the distal end of the suction nozzle 161 into contact with the electronic component supplied from the component containing section 105, and to provide a negative-pressure suction force to the suction nozzle 161 to allow the electronic component to be held by the suction nozzle 161. Suction-holding the electronic component, the head unit 106 moves to the position just above the board 103, and transfers the electric component to a given position. In this manner, the component transfer operation of transferring the electronic component from the component containing section 105 to a component mounting region of the board 103 is repeatedly performed.

Figure 1:
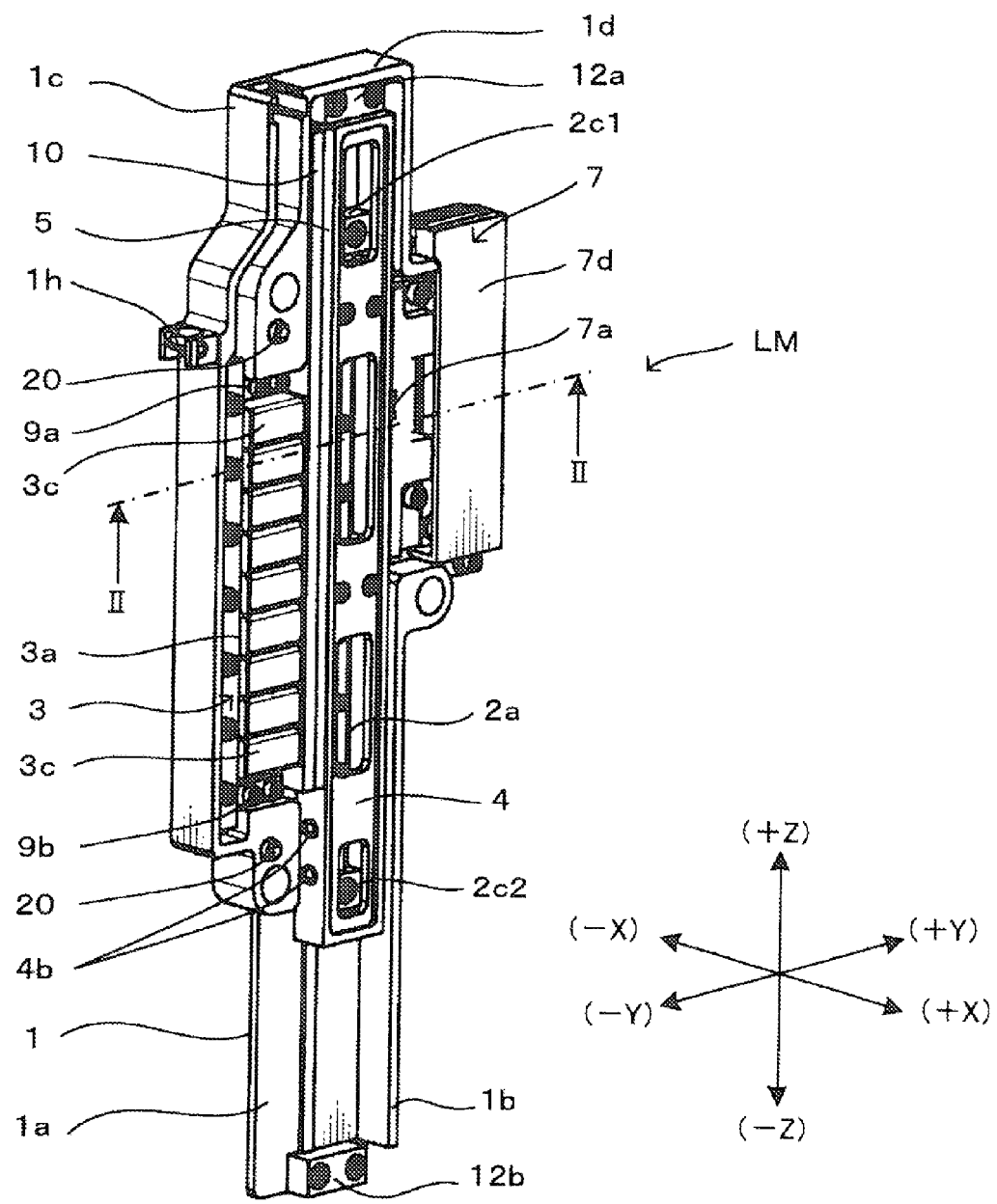
FIG. 1 is a perspective view of a single-shaft linear motor according to one embodiment of the present invention.

As above, the surface mounter according to this embodiment is adapted to drive the nozzle shaft 163 up and down in the Z-axis direction using the multi-shaft linear motor MLM formed such that the ten single-shaft linear motors LM1 to LM10, each having the same structure as that of the single-shaft linear motor LM illustrated in FIG. 1, are arranged by stacking in the frontward-rearward direction X. Thus, the following functions/effects can be obtained. Each of the single-shaft linear motors LM1 to LM10 has a sufficient propulsion force even with a small thickness as described above. This makes it possible to transfer a relatively heavy component as well as a lightweight component by the suction nozzle 161 attached to a forward end of the nozzle shaft 163. In addition, based on a reduction in thickness of the single-shaft linear motors LM1 to LM10, reductions in size and weight of the head unit 106 can be facilitated. This contributes to a reduction in size of the surface mounter, and allows a movement speed in both the direction X and the direction Y to be increased, which significantly contributes to a reduction in mounting time. Furthermore, the single-shaft linear motors LM1 to LM10 each having a shape with a small depth dimension are arranged by stacking. This makes it possible to arrange the movable bases 4 at a small pitch in the frontward-rearward direction X, and thereby reduce a pitch PT of the nozzle shafts 163 and the suction nozzles 161 coupled to the respective ones of the movable bases 4, in the frontward-rearward direction X.

<Other Modifications>

In the above embodiment, the multi-shaft linear motor MLM using as the upward/downward driving mechanism a plurality of single-shaft linear motors each having the same structure as that of the single-shaft linear motor LM according to the first embodiment. Alternatively, a multi-shaft linear motor comprising a plurality of the single-shaft linear motors LM according to the first or second embodiment, or a multi-shaft linear motor comprising a plurality of single-shaft linear motors each having the same structure as that of the single-shaft linear motor LM according to the second embodiment, or a multi-shaft linear motor MLM comprising a plurality of combinations of the single-shaft linear motors according to the first and second embodiment, may also be used.

In the above embodiment, the present invention is applied to a surface mounter MT functioning as a component transfer apparatus. However, applications of the present invention are not limited thereto, but the present invention may be applied to any other suitable type of component transfer apparatus, such as an IC handler.

As described above, according to one aspect of the present invention, there is provided a shingle-shaft linear motor which is provided with a magnetic body and an armature. The shingle-shaft linear motor is adapted to produce a force causing the magnet body and the armature to be relatively displaced along a given linear moving direction by interaction of magnetic fluxes generated between the magnetic body and the armature during an operation of supplying electric power to the armature. The shingle-shaft linear motor comprises a base plate adapted to set the moving direction on a base surface thereof, a movable section attached to the base plate in such a movable manner as to relatively reciprocate along the moving direction with respect to the base plate, a mover provided on the movable section, the mover formed as one of the magnetic body and the armature, a stator provided on the base surface of the base plate in such a manner as to be disposed opposed to the mover in a widthwise direction, the stator formed as the other one of the magnetic body and the armature to extend along the moving direction, and a standing wall provided on an outer peripheral edge of the base plate at least at a position which is along the moving direction, to define a containing space in cooperation with the base surface, wherein the containing space is opened to allow the stator, the mover, and the movable section to be selectively mounted therein and removed therefrom in a direction perpendicular to the base surface.

In a preferred embodiment, the standing wall is formed to define an open zone opened at one end of the containing space in the moving direction to allow a driven object coupled to the movable section to be moved in and out of the containing space according to driving of the movable section in the moving direction.

In another preferred embodiment, the movable section, the stator, and the mover are accommodated in the containing space within a bottom-side of the containing space with respect to the direction perpendicular to the base surface.

In another preferred embodiment, the shingle-shaft linear motor of the present invention Also comprises a cover member attached to a top of the standing wall to cover the opening in such a manner as to close the containing space in which the movable section, the stator, and the mover are contained.

According to another aspect of the present invention, there is provided a multi-shaft linear motor which comprises a plurality of the above single-shaft linear motors, wherein the single-shaft linear motors are arranged by stacking in a stacking direction perpendicular to the base surface. Also, the containing space of a lower-side one of the single-shaft linear motors located on a bottom side thereof in the stacking direction is covered by a back surface of a upper-side one of the single-shaft linear motors located on the side of a top of the lower-side single-shaft linear motor in adjacent relation.

In a preferred embodiment, the multi-shaft linear motor Also comprises a cover member attached to a top of the standing wall of a topmost one of the single-shaft linear motors in the stacking direction, to close the opening of the topmost single-shaft linear motor, in such a manner as to close the containing space of the topmost single-shaft linear motor to cover the movable section, the stator, and the mover contained in the containing space, from a upper-side with respect to the topmost single-shaft linear motor in the stacking direction.

In a preferred embodiment, the single-shaft linear motors in the multi-shaft linear motor are arranged by stacking in a stacking direction perpendicular to the base surface.

According to yet another aspect of the present invention, there is provided a component transfer apparatus for transferring a component from a component containing section to a component mounting area. The component transfer apparatus comprises: a head unit including a base member, a nozzle shaft supported movably relative to the base member in an upward-downward direction, and an upward/downward driving mechanism adapted to drive the nozzle shaft in the upward-downward direction; and head driving means adapted to move the head unit between a position just above the component containing section and a position just above the component mounting area. The nozzle shaft is adapted to provide a suction nozzle attached to a forward end thereof with a negative pressure supplied through a negative-pressure pipe connected to a backward end thereof. The upward/downward driving mechanism is the above single-shaft linear motor. The shingle-shaft linear motor is attached to the base member in such a manner that the moving direction becomes parallel to the upward-downward direction, and the movable section of the linear motor is coupled to the nozzle shaft.

According to still another aspect of the present invention, there is provided a component transfer apparatus for transferring a component from a component containing section to a component mounting area. The component transfer apparatus comprises: a head unit including a base member, a nozzle shaft supported movably relative to the base member in an upward-downward direction, and an upward/downward driving mechanism adapted to drive the nozzle shaft in the upward-downward direction; and head driving means adapted to move the head unit between a position just above the component containing section and a position just above the component mounting area. The nozzle shaft is adapted to provide a suction nozzle attached to a forward end thereof with a negative pressure supplied through a negative-pressure pipe connected to a backward end thereof. The upward/downward driving mechanism is the above multi-shaft linear motor. The multi-shaft linear motor is attached to the base member in such a manner that the moving direction becomes parallel to the upward-downward direction. Plurality of the single-shaft linear motors constituting the multi-shaft linear motor are associated with a plurality of the nozzle shafts in a one-to-one correspondence. The movable section of each of the single-shaft linear motors is coupled to a corresponding one of the nozzle shafts.

The invention claimed is:

1. A single-shaft linear motor provided with a magnetic body and an armature, the single-shaft linear motor adapted to produce a force causing the magnet body and the armature to be relatively displaced along a given linear moving direction by interaction of magnetic fluxes generated between the magnetic body and the armature during an operation of supplying electric power to the armature, comprising:
    a base plate having a thin tray-shape, said base plate being adapted to set the moving direction on a base surface thereof;
    a movable section attached to the base plate in such a movable manner as to relatively reciprocate along the moving direction with respect to the base plate;
    a mover provided on a lateral surface of the movable section with respect to one side of a widthwise direction of the base surface, said widthwise direction is perpendicular to the moving direction and to a perpendicular direction that is perpendicular to the base surface, the mover formed as one of the magnetic body and the armature;
    a stator provided on the base surface of the base plate to be disposed opposed to the mover from a one edge side toward another edge side in the widthwise direction so as to downsize the linear motor in the perpendicular direction to allow the linear motor to have a thin structure, the stator formed as the other one of the magnetic body and the armature to extend along the moving direction;
    a standing wall provided on an outer peripheral edge of the base plate at least at a position which is along the moving direction, to define a containing space in cooperation with the base surface, the containing space being opened to allow the stator, the mover, and the movable section to be selectively mounted therein and removed therefrom in a direction perpendicular to the base surface;
    at least a sub-tooth provided on the base surface of the base plate, said sub-tooth is adapted to reduce the cogging-force which occurs during the operation; and
    a magnetic plate provided between the base plate and said sub-tooth, said magnetic plate is adapted to supplement the cogging-force reducing effect by the sub-tooth.

2. The single-shaft linear motor as defined in claim 1, wherein the standing wall is formed to define an open zone opened at one end of the containing space in the moving direction to allow a driven object coupled to the movable section to be moved in and out of the containing space according to driving of the movable section in the moving direction.

3. The single-shaft linear motor as defined in claim 1, wherein the movable section, the stator, and the mover are accommodated entirely in the containing space within a bottom-side of the containing space with respect to the direction perpendicular to the base surface.

4. The single-shaft linear motor as defined in claim 1, further comprising a cover member attached to a top of the standing wall to cover the opening to close the containing space in which the movable section, the stator, and the mover are contained.

5. A multi-shaft linear motor comprising a plurality of single-shaft linear motors, each single-shaft linear motor provided with a magnetic body and an armature, the single-shaft linear motor adapted to produce a force causing the magnet body and the armature to be relatively displaced along a given linear moving direction by interaction of magnetic fluxes generated between the magnetic body and the armature during an operation of supplying electric power to the armature, the single-shaft linear motor includes:
    a base plate having a thin tray-shape, said base plate being adapted to set the moving direction on a base surface thereof;
    a movable section attached to the base plate in such a movable manner as to relatively reciprocate along the moving direction with respect to the base plate;
    a mover provided on a lateral surface of the movable section with respect to one side of a widthwise direction of the base surface, said widthwise direction is perpendicular to the moving direction and to a perpendicular direction that is perpendicular to the base surface, the mover formed as one of the magnetic body and the armature;
    a stator provided on the base surface of the base plate to be disposed opposed to the mover from a one edge side toward another edge side in the widthwise direction to downsize the linear motor in the perpendicular direction to allow the linear motor to have a thin structure, the stator formed as the other one of the magnetic body and the armature to extend along the moving direction;
    a standing wall provided on an outer peripheral edge of the base plate at least at a position which is along the moving direction, to define a containing space in cooperation with the base surface, the containing space being opened to allow the stator, the mover, and the movable section to be selectively mounted therein and removed therefrom in a direction perpendicular to the base surface, wherein the movable section, the stator, and the mover are accommodated entirely in the containing space within a bottom-side of the containing space with respect to the direction perpendicular to the base surface;
    at least a sub-tooth provided on the base surface of the base plate, said sub-tooth is adapted to reduce the cogging-force which occurs during the operation; and
    a magnetic plate provided between the base plate and said sub-tooth, said magnetic plate is adapted to supplement the cogging-force reducing effect by the sub-tooth,
    wherein the single-shaft linear motors are arranged by stacking in a stacking direction perpendicular to the base surface, and
    wherein the containing space of a lower-side one of the single-shaft linear motors located on a bottom side thereof in the stacking direction is covered by a back surface of an upper-side one of the single-shaft linear motors located on a side of a top of the lower-side single-shaft linear motor in adjacent relation.

6. The multi-shaft linear motor as defined in claim 5, further comprising a cover member attached to a top of the standing wall of a topmost one of the single-shaft linear motors in the stacking direction, to close the opening of the topmost single-shaft linear motor, in such a manner as to close the containing space of the topmost single-shaft linear motor to cover the movable section, the stator, and the mover contained in the containing space, from a upper-side with respect to the topmost single-shaft linear motor in the stacking direction.

7. The multi-shaft linear motor as defined in claim 5, wherein each of the single-shaft linear motors has a cover member attached to a top of the standing wall thereof to cover the opening in such a manner as to close the containing space in which the movable section, the stator, and the mover are contained.

8. A component transfer apparatus for transferring a component from a component containing section to a component mounting area, comprising:
   a head unit including a base member, a nozzle shaft supported movably relative to the base member in an upward-downward direction, the nozzle shaft adapted to provide a suction nozzle attached to a forward end thereof with a negative pressure supplied through a negative-pressure pipe connected to a backward end thereof, and an upward/downward driving mechanism adapted to drive the nozzle shaft in the upward-downward direction; and
   head driving means adapted to move the head unit between a position just above the component containing section and a position just above the component mounting area,
   wherein the upward/downward driving mechanism is a single-shaft linear motor provided with a magnetic body and an armature, single-shaft linear motor adapted to produce a force causing the magnet body and the armature to be relatively displaced along a given linear moving direction by interaction of magnetic fluxes generated between the magnetic body and the armature during an operation of supplying electric power to the armature, the single-shaft linear motor includes:
   a base plate having a thin tray-shape, said base plate being adapted to set the moving direction on a base surface thereof;
   a mover provided on a lateral surface of the movable section with respect to one side of a widthwise direction of the base surface, said widthwise direction is perpendicular to the moving direction and to a perpendicular direction that is perpendicular to the base surface, the mover formed as one of the magnetic body and the armature;
   a stator provided on the base surface of the base plate to be disposed opposed to the mover from a one edge side toward another edge side in the widthwise direction to downsize the linear motor in the perpendicular direction to allow the linear motor to have a thin structure, the stator formed as the other one of the magnetic body and the armature to extend along the moving direction;
   a standing wall provided on an outer peripheral edge of the base plate at least at a position which is along the moving direction, to define a containing space in cooperation with the base surface, the containing space being opened to allow the stator, the mover, and the movable section to be selectively mounted therein and removed therefrom in a direction perpendicular to the base surface, wherein the movable section, the stator, and the mover are accommodated entirely in the containing space within a bottom-side of the containing space with respect to the direction perpendicular to the base surface;
   at least a sub-tooth provided on the base surface of the base plate, said sub-tooth is adapted to reduce the cogging-force which occurs during the operation; and
   a magnetic plate provided between the base plate and said sub-tooth, said magnetic plate is adapted to supplement the cogging-force reducing effect by the sub-tooth,
   wherein the single-shaft linear motor is attached to the base member in such a manner that the moving direction becomes parallel to the upward-downward direction; and
   wherein the movable section of the linear motor is coupled to the nozzle shaft.

9. The component transfer apparatus as defined in claim 8, wherein the upward/downward driving mechanism is a multi-shaft linear motor having the plurality of the single-shaft linear motors arranged by stacking in a stacking direction perpendicular to the base surface;
   wherein the containing space of a lower-side one of the single-shaft linear motors located on a bottom side thereof in the stacking direction is covered by a back surface of a upper-side one of the single-shaft linear motors located on the side of a top of the lower-side single-shaft linear motor in adjacent relation;
   wherein the multi-shaft linear motor is attached to the base member in such a manner that the moving direction becomes parallel to the upward-downward direction, and the plurality of single-shaft linear motors constituting the multi-shaft linear motor are associated with a plurality of the nozzle shafts in a one-to-one correspondence; and
   wherein the movable section of each of the single-shaft linear motors is coupled to a corresponding one of the nozzle shafts.

10. The component transfer apparatus as defined in claim 9, wherein at least the top in the staking direction of the single-shaft linear motors has a cover member attached to a top of the standing wall thereof to cover the opening in such a manner as to close the containing space in which the movable section, the stator, and the mover are contained.

* * * * *